US012638695B2

(12) United States Patent
Braunger

(10) Patent No.: US 12,638,695 B2
(45) Date of Patent: May 26, 2026

(54) SPECTACLE LENS DESIGN, METHOD OF MANUFACTURING A SPECTACLE LENS AND METHOD OF PROVIDING A SPECTACLE LENS FOR AT LEAST RETARDING MYOPIA PROGRESSION

(71) Applicant: Carl Zeiss Vision International GmbH, Aalen (DE)

(72) Inventor: Dieter Braunger, Essingen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 368 days.

(21) Appl. No.: 18/322,706

(22) Filed: May 24, 2023

(65) Prior Publication Data

US 2023/0296917 A1 Sep. 21, 2023

Related U.S. Application Data

(63) Continuation of application No. PCT/EP2021/083248, filed on Nov. 26, 2021.

(30) Foreign Application Priority Data

Nov. 26, 2020 (EP) ..................................... 20211639

(51) Int. Cl.
*G02C 7/02* (2006.01)
*B29D 11/00* (2006.01)

(52) U.S. Cl.
CPC ........ *G02C 7/022* (2013.01); *B29D 11/00326* (2013.01); *G02C 2202/24* (2013.01)

(58) Field of Classification Search
CPC . G02C 7/022; G02C 7/16; G02C 7/06; G02C 7/024; G02C 7/061; G02C 2202/24; B29D 11/00326; B29D 11/00009

(Continued)

(56) References Cited

U.S. PATENT DOCUMENTS

| 7,178,918 B2 | 2/2007 | Griffin |
| 2003/0156248 A1 | 8/2003 | Portney |

(Continued)

FOREIGN PATENT DOCUMENTS

| CN | 109633925 A | 4/2019 |
| CN | 110068937 A | 7/2019 |

(Continued)

OTHER PUBLICATIONS

Communication of a notice of opposition issued in EP 4 006 624, which is a counterpart hereof, mailed on Jan. 29, 2025.

(Continued)

*Primary Examiner* — William R Alexander
(74) *Attorney, Agent, or Firm* — Qubit IP, PLLC

(57) ABSTRACT

A spectacle lens design includes an aperture and at least two ring-shaped focusing structures surrounding the aperture. The aperture has a dioptric power, and the ring-shaped focusing structures surrounding the aperture provide an additional power relative to the dioptric power of the aperture. A ring-shaped diffuser is arranged between neighboring ring-shaped focusing structures. Neighboring ring-shaped focusing structures can adjoin each other with a ring-shaped contact line between them forming the ring-shaped diffuser. Neighboring ring-shaped focusing structures can also be arranged at a distance to each other and at least one of the ring-shaped focusing structures provides a ring shaped focal line. Neighboring ring-shaped focusing structures can also be arranged at a distance to each other and at least one of the ring-shaped focusing structures consists of lenslets that adjoin each other so as to form a ring of lenslets and provides a plurality of foci along a ring shaped line.

13 Claims, 7 Drawing Sheets

(58) Field of Classification Search
USPC .................................................. 351/159.41
See application file for complete search history.

(56) References Cited

U.S. PATENT DOCUMENTS

| | | | | |
|---|---|---|---|---|
| 2005/0187622 | A1* | 8/2005 | Sandstedt | ............. A61F 2/1627 |
| | | | | 623/6.22 |
| 2008/0086207 | A1* | 4/2008 | Sandstedt | ............... A61L 27/18 |
| | | | | 351/159.4 |
| 2010/0085536 | A1 | 4/2010 | Drobe | |
| 2016/0054588 | A1 | 2/2016 | Brennan et al. | |
| 2017/0131567 | A1 | 5/2017 | To et al. | |
| 2017/0276961 | A1* | 9/2017 | Wooley | .................. G02C 7/044 |
| 2019/0212583 | A1* | 7/2019 | Wu | ......................... G02C 7/105 |
| 2019/0227342 | A1* | 7/2019 | Brennan | .................. G02C 7/02 |
| 2019/0278107 | A1* | 9/2019 | Brennan | ................ G02C 7/066 |
| 2019/0293966 | A1* | 9/2019 | Tamura | ............ B29D 11/00413 |
| 2020/0253719 | A1* | 8/2020 | Liang | .................... A61F 2/1648 |
| 2020/0363654 | A1* | 11/2020 | Simard | ..................... G02C 7/06 |
| 2020/0409180 | A1* | 12/2020 | Guillot | ...................... G02C 7/06 |
| 2022/0011602 | A1* | 1/2022 | Chalberg, Jr. | .......... G02C 7/06 |

FOREIGN PATENT DOCUMENTS

| | | | |
|---|---|---|---|
| CN | 111103701 | A | 5/2020 |
| CN | 212160264 | U | 12/2020 |
| EP | 0 445 994 | A2 | 9/1991 |
| EP | 0 741 315 | A2 | 11/1996 |
| EP | 1 884 219 | A2 | 2/2008 |
| EP | 2115527 | B1 | 11/2009 |
| EP | 2 175 307 | A1 | 4/2010 |
| EP | 2 286 765 | A1 | 2/2011 |
| EP | 2383603 | B1 | 11/2011 |
| EP | 3553594 | A1 | 10/2019 |
| EP | 3561578 | A1 | 10/2019 |
| EP | 3 821 851 | A1 | 1/2020 |
| TW | 20201353 | A | 1/2020 |
| WO | 94/00788 | A1 | 1/1994 |
| WO | 97/12272 | A1 | 4/1997 |
| WO | 2004/113959 | A2 | 12/2004 |
| WO | 2005055891 | A1 | 6/2005 |
| WO | 2007041796 | A1 | 4/2007 |
| WO | 2007092853 | A2 | 8/2007 |
| WO | 2009052570 | A1 | 4/2009 |
| WO | 2009129528 | A1 | 10/2009 |
| WO | 2010075319 | A2 | 7/2010 |
| WO | 2010129465 | A1 | 11/2010 |
| WO | 2018026697 | A1 | 2/2018 |
| WO | 2018/129566 | A2 | 7/2018 |
| WO | 2019152438 | A1 | 8/2019 |
| WO | 2019166653 | A1 | 9/2019 |
| WO | 2019166654 | A1 | 9/2019 |
| WO | 2019166655 | A1 | 9/2019 |
| WO | 2019166657 | A1 | 9/2019 |
| WO | 2019166659 | A1 | 9/2019 |
| WO | 2019206569 | A1 | 10/2019 |
| WO | 2020014613 | A1 | 1/2020 |
| WO | 2020113212 | A1 | 6/2020 |
| WO | 2020180817 | A1 | 9/2020 |
| WO | 2021/038405 | A1 | 3/2021 |
| WO | 2021/047488 | A1 | 3/2021 |

OTHER PUBLICATIONS

U.S. Appl. No. 18/319,133, filed May 17, 2023, Dieter Braunger.
U.S. Appl. No. 18/323,517, filed May 25, 2023, Dieter Braunger.
Schaeffel et al., conference presentation entitled "Individualized myopia treatment for children," Innovation Symposium Ophthalmic Surgery, available at https://augenchirurgie.clinic/hilfe/videos/isa19-individualisierte-myopiebehandlung-bei-kindern, Jan. 19, 2019, relevance is found at least in paragraph [0013] of the specification, last accessed Jun. 28, 2023.
Koeppen, "Conception and development of progressive lenses," Deutsche Optiker Zeitung DOZ 10/95, pp. 42 to 46, 1995.
Internet site "MiYOSMART lenses," available at https://www.hoyavision.com/en-hk/vision-products/miyosmart/ last accessed May 30, 2023.
Industrial Norm "Ophthalmic optics—Spectacle lenses—Vocabulary (ISO 13666:2019)," English version EN ISO ISO 13666:2019, Dec. 2019.
European Search Report issued in EP 20211639.8, to which this application claims priority, mailed May 11, 2021.
International Search Report and Written Opinion issued in PCT/EP2021/083248, to which this application claims priority, mailed Mar. 2, 2022.
Written opinion of the International Preliminary Examining Authority issued in PCT/EP2021/083248, to which this application claims priority, mailed Nov. 16, 2022.
Office Action by the Chinese Patent Office (SIPO) issued in CN 202180092006.4, which is a counterpart hereof, mailed on Jun. 6, 2025, and English-language translation thereof.
Office action by the Indian Patent Office issued in Indian patent application IN 202317039028, which is a counterpart hereof, mailed Jan. 15, 2026 (in Hindi and English).
Office action by the Chinese Patent Office issued in Chinese patent application CN 202311410612.3, which is a counterpart hereof, mailed Sep. 24, 2025, and English-language machine translation thereof.
Office action by the Chinese Patent Office issued in Chinese patent application CN 202180092006.4, which is a counterpart hereof, mailed Jan. 27, 2026, and English-language machine translation thereof.

* cited by examiner

Receiving lens
design data — S11

Forming single
vision spectacle lens — S12

Forming ring-shaped
focusing structures — S13

Providing diffuser — S14

SPECTACLE LENS DESIGN, METHOD OF MANUFACTURING A SPECTACLE LENS AND METHOD OF PROVIDING A SPECTACLE LENS FOR AT LEAST RETARDING MYOPIA PROGRESSION

CROSS REFERENCE TO RELATED APPLICATIONS

This application is a continuation application of international patent application PCT/EP2021/083248, filed on Nov. 26, 2021 and designating the U.S., which claims priority to European patent application EP 20 211 639.8, filed on Nov. 26, 2020, both of which are hereby incorporated by reference in their entireties.

TECHNICAL FIELD

The present disclosure relates to a spectacle lens design for a spectacle lens, in particular for a single vision spectacle lens, to be positioned relative to the eye of a wearer according to a given as-worn position and to a method of manufacturing such a spectacle lens. In addition, the disclosure relates to method of providing a spectacle lens for at least retarding myopia progression based on measured eye-data.

BACKGROUND

The prevalence of myopia (short sightedness) is increasing rapidly. Myopia significantly increases the risk of retinal detachment, (depending on the level of myopia), posterior cataract and glaucoma. The optical, visual and potential pathological effects of myopia and its consequent inconvenience and cost to the individual and community, makes it desirable to have effective strategies to slow the progress, or prevent or delay the onset of myopia, or limit the amount of myopia occurring in both children and young adults.

WO 2005/055891 A1 and WO 2007/092853 A2, however, disclose that peripheral retinal image (i.e., peripheral vision) plays a major role in determining overall eye length, and is an effective stimulus that promotes peripheral and total eye growth that results in axial elongation, an overall increase in eye size and myopia.

In a key experiment described in WO 2005/055891 A1, primates were reared with annular diffusing lenses placed in front of the eye. The annular diffusing lenses allowed light rays from on axis, central field objects to reach the eye unobstructed. The same annular diffusing lenses scattered or diffused light rays from off-axis, peripheral field objects. This scattering induced form deprivation only to off-axis visual objects in the peripheral field, while maintaining clear vision for the central field. It is known to vision scientist working on myopia development that form deprivation applied to the entire visual field (or central field) of the eye induces axial growth leading to myopia. In the experiment disclosed in WO 2005/055891 A1, involving form deprivation to only the peripheral field, the eye also developed myopia due to axial elongation and eye growth.

In an extension to the experiment described in WO 2005/055891 A1, the annular diffusing lenses were removed from some eyes following development of substantial amounts of myopia. When the annular diffusing lenses were removed, the amount of myopia in the primates decreased.

Further, in a parallel extension to the experiment, for other eyes, in addition to removal of the annular diffusing lenses following development of substantial amounts of myopia, central vision of the primate's eye was eliminated, by using an Argon (blue-green) laser to ablate the macular portion of the retina by photocoagulation, essentially blinding central vision while sparing peripheral vision. Even when on-axis central, foveal vision was interrupted in this manner, the decrease in myopia remained similar to when central vision was not disrupted. Based on learning from these experiments that demonstrate that the peripheral retinal image (i.e., peripheral vision) plays a major role in determining overall eye length, and is an effective stimulus that promotes peripheral and total eye growth that results in axial elongation, an overall increase in eye size and myopia, WO 2005/055891 A1 discloses a method of abating, retarding or eliminating the progression of myopia in an individual by controlling off-axis aberrations through manipulating the curvature of field of a visual image in a predetermined fashion and ultimately altering, reducing or eliminating eye axial elongation. In this method by which myopia progression may be retarded (and in many cases, halted or reversed) an optical device having a predetermined off-axis aberration-controlled design that abates, retards or eliminates eye growth while simultaneously providing clear central imaging is used.

The authors of WO 2005/055891 A1 describe a method and apparatus for controlling optical aberrations to alter relative curvature of field by providing ocular apparatuses, systems and methods comprising a predetermined corrective factor to produce at least one substantially corrective stimulus for repositioning peripheral, off-axis, focal points relative to the central, on-axis or axial focal point while maintaining the positioning of the central, on-axis or axial focal point on the retina. The method and apparatuses are used to provide continuous, useful clear visual images while simultaneously retarding or abating the progression of myopia.

The authors propose e.g., an optical device, such as spectacles, contact lenses, artificial corneal devices such as on-lays and in-lays, corneal implants, anterior chamber lenses or intraocular lenses, or employing interventions, such as methods for corneal and epithelial remodeling and sculpting including orthokeratology and refractive surgery such as epikeratophakia, thermokeratoplasty, LASIK, LASEK, and PRK that can provide a resultant negative relative curvature of field at the retina, and that in addition, in order to continue to provide good central visual acuity for critical visual tasks, the optical device or optical intervention should ensure good focus of central field image to the retina.

The documents WO 2005/055891 A1 and WO 2007/092853 A2 disclose a suitable spectacle lens. This spectacle lens is designed such that it would generate a negative relative curvature of field on the eye. According to the authors this arrangement is advantageous over conventional under-correction approaches as the central, on-axis image point is focused sharply to the fovea enabling good visual acuity. The peripheral image points, due to the negative relative curvature of field, are focused more anteriorly, or in front (i.e., in the direction against the direction of light in the eye) of the retina. This has the effect of producing a relative under-correction to the peripheral field, which, from the experiment results, would control eye growth and axial elongation. That is, due to the more anterior location of the off-axis, peripheral field image points, stimulus to axial growth is significantly reduced, eliminated or reversed in the eye, leading to reduction or elimination of myopia development or reduction and even reversal of myopia progression.

The first versions of spectacle lenses following this approach are developed by the Carl Zeiss Vision group in cooperation with the Brian Holden Vision Institute. One of the first spectacle lens designs following this approach is e.g., disclosed in WO 2007/041796 A1.

Another spectacle lens design being launched under the trademark Myovision is e.g., disclosed in WO 2009/052570 A1.

According to Prof. Schäffel in a presentation entitled "Individualisierte Myopiebehandlung bei Kindern [Individualized myopia treatment in children]" by Prof. Dr. Frank Schaeffel and Dr. Hakan Kaymak (Innovationssymposium 2019)" held on Jan. 19, 2019 in Dusseldorf, Germany, Essilor markets a similar design under the trademark Myopilux.

Further lens designs following the theory described in WO 2005/055891 A1 are disclosed in WO 2009/129528 A1 assigned inter alia to Novartis AG. These lens designs being characterized by a peripheral optical zone surrounding a central zone. Said peripheral zone includes an incident angle with respect to the optical axis of about 30 degrees and has a positive peripheral refractive power relative to the refractive power of the central zone of that lens to thereby provide myopic peripheral defocus. Despite WO 2009/129528 A1 indicates the suitability of said lens for spectacles, in particular, the above co-applicant points to a design targeted for a contact lens.

Well known due to market success are in particular Coopervision's contact lenses, the principle of which is, e.g., disclosed in WO 2010/129465 A1. The ophthalmic lens disclosed therein comprises or includes a vision correction region and a myopic defocus region. In an example disclosed in WO 2010/129465 A1 the ophthalmic lens is a contact lens comprises an annular zone with three subrings which surrounds a central zone. While two of the sub-rings belong to the myopic defocus region the third sub-ring, which separates the two sub-rings belonging to the myopic defocus region, belongs to the vision correction region, together with the central zone. The vision correction region and the myopic defocus region define an optic zone of the contact lens. The optic zone is circumscribed by a non-optical peripheral zone which extends from an outer perimeter of the optic zone to a peripheral edge zone of the contact lens. The optic zone comprises or consists of a plurality of concentric rings circumscribing a central circular zone.

The central zone of the contact lens is circular or substantially circular and may have a distance optical power and a diameter greater than 2.0 mm. The diameter of the central zone can be determined by measuring a straight line through the optic axis to opposing perimeter boundaries of the central zone in a two-dimensional front plan view of the contact lens.

Similar designs allegedly being suitable for contact lenses and spectacle lenses are also disclosed in US 2016/054588 A1, US2017/276961 A1 and US 2019/227342 A1 assigned to Johnson & Johnson.

In particular, US 2019/0227342 A1 discloses an ophthalmic lens having a center zone with a negative power for myopic vision correction; and at least one treatment zone surrounding the center zone. The at least one treatment zone having a power profile comprising an ADD power. The at least one treatment zone has a surface shape composing a portion of a generally toroidal shape. The at least one treatment zone is arranged as to form a continuous surface with the center zone. As an example, the portion of the toroidal shape may be derived from a torus (e.g., spheroidal torus), wherein a slice through the surface of the spheroidal torus to generate the portion of the toroidal shape comprises a right circular conical surface with the principal axis of the cone coincident with the axis of rotation about which the torus is generated. The treatment zone may be configured to result in a ring focus. A position of the focal ring may be dependent upon the optical power of the treatment zone.

Optical function of a radially concentric multizone ophthalmic lens that serves at least a spherical correction purpose according to US 2019/0227342 A1 is most generally derived from a front and back surface. One of these surfaces may be spheroidal or ellipsoidal in nature. The other surface typically has a spheroidal or ellipsoidal cap and then one or more curved portions, each of which is the surface of a spheroidal or ellipsoidal frustum ("zone") that is symmetrically arranged so as to form a continuous surface. The zones may be radially concentric and optically coaxial about a common axis.

Each frustum may be created by sectioning a spheroid or ellipsoid of appropriate size and shape to achieve the desired optical power, perpendicular to the principal axis of such spheroid or ellipsoid. In some cases, a transitional region (e.g., an optically dysfunctional) may be required to allow the individual zones to form a continuous surface. For myopia treatment, some of the zones will generally produce a more positive wavefront derivative than the zone or zones devoted to correct distance vision, where the wavefront derivative is taken with respect to the radial distance from the principal axis (dW/dr). Rays of light parallel to the common axis and passing through the zones will come to a principal focus for each zone, and these foci will be located on the common axis for rotationally symmetric zones. When the ophthalmic lens is used to correct vision and where one or more of the zones have principal foci of different focal length, the image formed at the retina of the eye may come along with ghosting or haloes, leading to degradation of vision.

US 2019/0227342 A1 discloses embodiments having a zone (or replacing a designed zone of the lens) with a surface shape derived from a toroidal shape (e.g., spheroidal torus) or, in the case of replacing multiple zones, from one or more tori. As an example, the portion of the toroidal shape to be utilized may be derived from a torus (e.g., a spheroidal torus), after making a slice in the shape of the surface of a right circular cone through the surface of the spheroidal torus wherein the principal axis of the cone is coincident with the axis of rotation about which the torus is generated. The portion of the torus forming part of the lens surface is so arranged as to form a continuous surface with other zones of the lens or being joined by an optically dysfunctional, transition region to allow the individual zones to form a continuous surface. Other slices (conical or otherwise) than outlined in the document are indicated as being suitable to be used.

Hong Kong Polytechnic University and Hoya recently disclosed a different kind of spectacle lenses following the general approach described in WO 2005/055891 A1. Hoya sells such spectacle lenses under the trademark MyoSmart. The spectacle lenses are known as MSMD (multi segment myopic defocus) lenses. The respective technical concept is known as D.I.M.S. (Defocus Incorporated Multiple Segments) technology. Details are, for example, disclosed on the internet site www.hoyavision.com/en-hk/discover-products/for-spectacle-wearers/special-lenses/myosmart/. Respective spectacle lenses are disclosed in US 2017/131567 A1. The spectacle lenses comprise a central zone providing full correction and a plurality of microlenses/lenslets surrounding the central zone and providing an additional power of e.g., approximately 3.5 D. A similar approach is used in Essilor's Stellest spectacle lenses being described in detail in EP 3 553 594 A1, EP 3 561 578 A1, WO 2019/166653 A1, WO 2019/166654 A1, WO 2019/166655 A1, WO 2019166657 A1, WO 2019/166659 A1 and WO 2019/206569 A1, respectively. The microlenses/lenslets are aspherical and have an optical power in their geometrical center which lies in the range between 2.0 dpt and 7.0 dpt in absolute value, and an optical power in their periphery which lies in the range between 1.5 dpt and 6.0 dpt in absolute value. The refractive optical power provided by the aspherical microlenses/lenslets exceeds the refractive power of the clear central zone by 0.5 dpt or more.

Also WO 2020/014613 A1 assigned to Sightglass Vision Inc. recently disclosed a myopia control spectacle lens that may contain one or more defocus elements, i.e., a myopia control spectacle lens may contain a clear center, free of said defocus elements treating children having, or suspected of having, myopia by having the children wear spectacles with myopia control lenses provides a safe, efficient, and non-invasive method for reducing the progression of juvenile myopia. Exemplarily, the document refers to regions that comprise island-shaped lenses.

WO 2010/075319 A2 also refers to the importance of peripheral retinal image determining myopic eye growth. The document proposes a therapeutic treatment method for preventing, ameliorating, or reversing eye-length-related disorders, the therapeutic treatment method comprising: identifying, in a patient, an eye-length-related disorder; and inducing artificial blurring of the patient's peripheral vision in order to decrease an average spatial frequency of images input to the retina of the eye past a threshold spatial frequency to inhibit further lengthening of the patient's eye. In particular, the document proposes providing the patient with spectacle lenses having a first area including a plurality of first elements selected from the group consisting of: (i) bumps on a surface of the spectacle lens; (ii) depressions on the surface of the spectacle lens; (iii) first translucent inclusions in a spectacle lens material; and (iv) first transparent inclusions in the spectacle lens material, the first transparent inclusions having a refractive index different from that of the spectacle lens material. The elements in general are point-shaped elements having a non-zero point density in a range between 0 and 8 dots per $mm^2$.

Improvements of this kind of spectacle lenses are disclosed in WO 2018/026697 A1 and WO 2019/152438 A1, respectively.

In particular, WO 2018/026697 A1 discloses a pair of eyeglasses, comprising: eyeglass frames; and a pair of spectacle lenses mounted in the frames, the spectacle lenses comprising a point pattern distributed across each spectacle lens, the point pattern comprising an array of dots spaced apart by a distance of 1 mm or less, each point having a maximum dimension of 0.3 mm or less.

WO 2020/113212 A1 and a contrast reduction region comprising scattering centers and/or one or more lenslets for reducing image contrast.

WO 2019/152438 A1 discloses a spectacle lens, comprising: a lens material having two opposing curved surfaces; and a scattering region surrounding a clear aperture, wherein the scattering region has a plurality of spaced apart scattering centers sized and shaped to scatter incident light, the scattering centers being arranged in a pattern that includes an irregular variation in spacing between adjacent scattering centers and/or an irregular variation in scattering centers size.

WO 2010/075319 A2, WO 2018/026697 A1, WO 2019/152438 A1 and WO 2020/014613 A1 describe spectacle lenses with artificial peripheral scattering while WO 2020/

113212 A1 and WO 2020180817 A1 describe spectacle lenses with a contrast reduction region comprising scattering centers and/or one or more lenslets for reducing image contrast. Introducing artificial peripheral scattering is somewhat in contradiction to the findings described in WO 2005/055891 A1 and WO 2007/092853 A2 with respect to annular diffusing lenses, however, the results of respective trials based on SightGlass Vision's DOT spectacle lenses have been disclosed to be promising.

Each microlens/lenslet of the spectacle lenses described in US 2017/131567 A1 or EP 3 553 594 A1, EP 3 561 578 A1, WO 2019/166653 A1, WO 20191/66654 A1, WO 2019/166655 A1, WO 2019/166657 A1, WO 2019/166659 A1 and WO 2019/206569 A1, respectively, and being described in detail above, must separately be produced. Therefore, there is a need for spectacle lenses which may be produced by a simplified fabrication technology but still providing optical properties resembling those described in the foregoing to control myopia progression.

From US 2019/0227342 A1 contact lenses and spectacle lenses using a torus instead of. microlenses/lenslets for providing a myopic defocus are known. However one very feature disclosed in US 2019/0227342 A1 is that the portion of the torus forming part of the lens surface is so arranged as to form a continuous surface with other zones of the lens or being joined by an optically dysfunctional, transition region to allow the individual zones to form a continuous surface. To achieve the continuity a specific adaption in the design of the surface of the contact lens or spectacle lens is necessary, which means amending the whole surface of the contact lens or spectacle lens as compared to a surface without the torus. In addition, also as specific adaptions in production are necessary. Moreover, in cease of more than one torus the zones between the tori do not contribute in at least retarding myopia progression.

WO 2020/113212 A1 discloses a spectacle lens design including a zone providing a focused image on the fovea that is surrounded by a zone with focusing structures for generating a myopic defocus or by a diffusing zone.

WO 2019/166657 A1, which is regarded as closest state of the art, discloses a spectacle lens design including an aperture that provides a focused image on the fovea and that is surrounded by a zone with focusing structures for generating a myopic defocus. A focusing structure of WO 2019/166657 A1 either provides a ring shaped focal line or a plurality of foci arranged along a ring shaped line. Between the focusing structures that surround the zone providing the focused image there is no means that contributes to stopping or slowing down myopia which means that the zone with focusing structures is not optimally used for stopping or slowing down myopia.

SUMMARY

With respect to WO 2019/166657 A1 it is a first objective of the present disclosure to improve the spectacle lens design of WO 2019/166657 A1 so that its effectivity in stopping or slowing down myopia is increased.

It is a second objective of the present disclosure to provide a method of manufacturing a spectacle lens which allows improving the spectacle lens design of WO 2019/166657 A1 so that that its effectivity in stopping or slowing down myopia is increased.

It is a third objective of the present disclosure to make available a computer implemented method of providing a spectacle lens design that allows for providing a spectacle lens design which is compared to the spectacle lens design disclosed in WO 2019/166657 A1 improved in that its effectivity in stopping or slowing down myopia is increased.

The first objective is achieved by spectacle lens designs for a spectacle lens having an aperture, at least two ring-shaped focusing structures, and a ring-shaped diffuser. The second objective is achieved by a method of manufacturing such a spectacle lens, and the third objective is achieved by a computer implemented method of providing such a spectacle lens design for at least retarding myopia progression.

The following definitions are used within the scope of the present description:

Additional Power

In the context of the present specification, the term "additional power" applies to a focal power that is added to the focal power of a spectacle lens, where the focal power of a spectacle lens provides, assisted by accommodation, a focused image on the fovea and the additional power, when added to the focal power of a spectacle lens, provides for a myopic defocus. The additional power must not be confused with the addition power of a progressive addition lens.

Aperture

In the context of the present specification, the term "aperture" applies to a zone of a spectacle lens that is surrounded by one or more ring-shaped structures. In some variants of the aperture, a number of structures may be located within the aperture. Such structures would provide an effect in addition to the focal power provided by the spectacle lens in the area of the aperture. However, the area occupied by the structures within the aperture should not exceed 20% of the whole area of the aperture. In other variants, the aperture is free of any structures so that the aperture only exhibits the focal power provided by the spectacle lens.

As-Worn Position

The as-worn position is the position, including orientation, of the spectacle lenses relative to the eyes and face during wear (DIN ISO 13666:2019, section 3.2.36). The as-worn position is determined by the as-worn pantoscopic angle, the as-worn face form angle and the vertex distance. The as-worn pantoscopic angle is the vertical angle between the horizontal and the perpendicular to a reference line passing through the apex of the grooves of the upper and lower rims of the frame in the vertical plane containing the primary direction (DIN ISO 13666:2019, section 3.2.37), where the primary direction is the direction of the line of sight, usually taken to be the horizontal, to an object at an infinite distance measured with habitual head and body posture when looking straight ahead in unaided vision (DIN ISO 13666:2019, section 3.2.25) and the line of sight is the ray path from the point of interest (i.e., point of fixation) in object space to the centre of the entrance pupil of the eye and its continuation in image space from the centre of the exit pupil to the retinal point of fixation (generally the foveola) (DIN ISO 13666:2019, section 3.2.24). Typical values of the as-worn pantoscopic angle lie in the range between –20 and +30 degree. The as-worn face form angle is the horizontal angle between the primary direction and the perpendicular to a reference line passing through the apex of the grooves of the nasal and temporal rims of the frame in the horizontal plane containing the primary direction (DIN ISO 13666: 2019, section 3.2.38). Typical values of the as-worn face form angle lie in the range between –5 and +30 degree. The vertex distance is the horizontal distance between the back surface of the spectacle lens and the apex of the cornea, measured with the eyes in the primary position (DIN ISO 13666:2019, section 3.2.40), where the primary position is the position of the eye when looking in the primary direction (DIN ISO 13666:2019, section 3.2.26). Typical valued of the vertex distance lie in the range between 5 mm and 30 mm. The as-worn position may be an individual as-worn position determined for a specific individual or a generic as-worn position determined for a defined group of wearers.

Central Zone

In the context of the present disclosure, a central zone is a zone of a spectacle lens or a spectacle lens design that is surrounded by a surrounding zone the optical properties of which differ from the surrounded central zone.

Clear Zone

In the context of the present specification, the term "clear zone" applies to a zone of a spectacle lens design or a spectacle lens that provides neither a myopic defocus nor a diffusion in foveal vision when a wearer looks through the clear zone with the spectacle lens being positioned according the specified as-worn position. Furthermore, a clear zone allows for achieving, if necessary assisted by accommodation, a focused image on the fovea. There may be zones of a spectacle lens design or a spectacle lens that do neither provide a myopic defocus nor a diffusion in foveal vision when a wearer looks through the respective zone but show a residual astigmatic error leading to a blurred image. Such a zone is not regarded as a clear zone in the meaning used in the present specification.

Contact Line

In the context of the present specification, the term "contact line" applies to a contact zone between two structures contiguously adjoining each other where the geometry surfaces of the structures is such that it is not continuously differentiable in a direction crossing the contact zone.

Data Carrier Signal

A data carrier signal is a pulse or a series of pulses of electricity or light that represents data as it travels over a wired or wireless network.

Diffuser

In optics, a diffuser (also called a light diffuser or optical diffuser) is an optical element that is made of any material that diffuses or scatters light in some manner to transmit soft light. Diffuse light can be easily obtained by reflecting light from a white surface, while more compact diffusers may use translucent material, including ground glass, Teflon, holographs, opal glass, and greyed glass. Scattering may be achieved by scattering centers which may be point-shaped, examples of which are, e.g., disclosed in WO 2010/075319 A2, WO 2018/026697 A1, WO 2019/152438 A1 and WO 2020/014613 A1, respectively. Scattering centers may also be line-shaped, e.g., in case of a contiguous connection having a not continuous transition and/or a not smooth transition.

Focal Power

The term "Focal power" is a collective term for the spherical vertex power, which brings a paraxial pencil of parallel light to a single focus (and which is usually considered in the prescription by the "sphere" value or, abbreviated, "sph", and the cylindrical vertex power of a spectacle lens, which brings a paraxial pencil of parallel light to two separate line foci mutually at right angles (DIN ISO 13666: 2019, section 3.10.2) and which is usually considered in the prescription by the "cylinder" value or, abbreviated, "cyl." The "vertex power" is the reciprocal of the paraxial vertex focal length (DIN ISO 13666:2019, section 3.10.7). Within the scope of the present description, a beam is to be considered to be a paraxial pencil of rays if its diameter does not exceed 0.05 mm, in particular 0.01 mm.

Lenslet or Microlens

In the context of the present disclosure, the term "lenslet" or "microlens" refers either to a small convex structure in the approximately spherical or ellipsoidal shape of a lens that is provided on a surface of a spectacle lens and has lateral dimensions that are at least by an order of magnitude smaller than the dimensions of the spectacle lens itself, or to a small area with a refractive index distribution that is provided in a spectacle lens body where the refractive index distribution has lateral dimensions that are at least by an order of magnitude smaller than the dimensions of the spectacle lens itself.

In case of the lenslets or microlenses being small convex structures, lenslets or microlenses are considered to adjoin each other in case there is a path between the centers of two lenslets that does not pass an area having solely the shape of the surface on which the Lenslets or microlenses are formed. In case of the lenslets or microlenses being refractive index distributions, lenslets or microlenses are considered to adjoin each other in case there is a path between the centers of two lenslets that does not pass an area having the refractive index of the spectacle lens body.

Myopic Defocus

The term "myopic defocus" refers to a situation in which light focusses in front of the fovea by such a distance that a focused image on the fovea cannot be achieved, even when assisted by accommodation. A peripheral myopic defocus is a myopic defocus that is present outside the visual field outside the fovea.

Peripheral Zone

In the context of the present disclosure, a peripheral zone shall be understood as a zone of a spectacle lens or a spectacle lens design which surrounds a central zone and corresponds to peripheral vision when a wearer of the spectacle lens looks through the central zone.

Prescription

The term "prescription" denotes a summary in which the dioptric powers necessary for correcting a diagnosed refractive error are specified in the form of suitable values. In the case of spherical power, the prescription may contain a value "sph" for sphere. In the case of astigmatic power, the prescription can contain values "cyl" for cylinder and "axis" for axis, and, in the case of prismatic power, the prescription can contain prism and base values. Moreover, the prescription may contain further values, for example the "add" value in the case of multifocal spectacle lenses, said "add" value specifying the difference between the vertex power in the near portion of the spectacle lens and in the distance portion of the spectacle lens. A value "PD" for the interpupillary distance may also be contained in the prescription.

Representation of a Spectacle Lens

In the context of the present disclosure, the expression "representation of a spectacle lens design" refers to an implementation of a spectacle lens having the respective design features (physical representation of the spectacle lens design) or to a numerical data set describing the design features (numerical representation of the spectacle lens design). For example, such a data set may be stored in a memory of a computer or on a computer-readable (particularly non-transitory) storage medium. In addition, the data set may be retrievable from a data network like, for example, the internet or a local area network (LAN). A dataset resembling a representation of a progressive spectacle lens design may include, in particular, a description of the geometric shape and the medium of the progressive spectacle lens. Such a description can e.g., include a mathematical description of the front surface, the rear surface, the arrangement of these surfaces in relation to one another (including the thickness) and the edge delimitation of the progressive spectacle lens as well as the refractive index distribution of the medium of which the progressive lens is to be made. The representation can be in coded or even in encrypted form. The term medium here means the material(s) or the substance the spectacle lens is made of.

The representation of the progressive spectacle lens design may in addition or alternatively include computer-readable instructions for controlling one or more manufacturing machines (e.g., casting, grinding, milling, lapping and/or polishing machines) in order to produce a spectacle lens having the respective design features.

Ring-Shaped

A structure shall be considered as ring-shaped (annular) if it surrounds a structure-free zone and there is a path within the structure which runs from a starting point within the structure around the structure-free zone and to the starting point again.

Ring-Shaped Focusing Structures

In the context of the present specification, the term "ring-shaped focusing structures" applies to structures providing a ring-shaped focal line as well as to lenslets contiguously adjoining each other so as to form a ring of lenslets and providing a plurality of (e.g., equidistantly arranged and typically mainly line-shaped or point-shaped) foci along a ring-shaped line. The lenslets do not need to be circular lenslets. Such ring-shaped focusing structures may e.g., comprise structures similar to those described in EP 3 561 578 A1.

Lenslets contiguously adjoining each other means in the context of the present disclosure that there is no space between said lenslets not contributing to the focal power of said lenslets. In case of the lenslets being small convex structures, contiguously adjoining lenslets are neighboring small convex structures that have at least one point in common. Examples of such contiguously adjoining lenslets are, e.g., disclosed in FIG. 12 of EP 3 561 578 A1. In case of the lenslets being small areas providing a refractive index distribution, contiguously adjoining lenslets are neighboring small areas of refractive index distribution with a point or area where the neighboring small areas of refractive index distribution overlap each other.

Semi-Finished Blank

The term "semi-finished blank" refers to a piece of optical material with one optically finished surface for the making of a spectacle lens (DIN ISO 13666:2019, section 3.8.1)

Spectacle Lens

A spectacle lens is an ophthalmic lens worn in front of, but not in contact with, the eyeball (DIN ISO 13666:2019, section 3.5.2), where an ophthalmic lens is a lens intended to be used for purposes of measurement, correction and/or protection of the eye, or for changing its appearance (DIN ISO 13666:2019, section 3.5.1).

The term "uncut spectacle lens" (DIN ISO 13666:2019, section 3.8.8) is a finished lens (3.8.7) prior to edging (3.8.10). A "cut spectacle lens" is therefore a finished lens after edging.

The present disclosure refers to both "uncut" and "cut spectacle lenses" and the respective designs, since the position of wear may be determined based on respective markings as defined in sec. 3.15.25 of said standard (see DIN ISO 13666:2019, section 3.9 for measurement purposes). However, the position of wear may be derived also from the rim contour of a "cut spectacle lens."

Spectacle Lens Design

The term optical spectacle lens design is used to denominate the calculated/predetermined or defined optical properties of a spectacle lens, typically for a predetermined specific wearer, taking into consideration a position/arrangement of the spectacle lens relative to a model of an eye of the wearer of the spectacle lens, a position/arrangement of a model of an object to be viewed by the wearer of the spectacle lens for a specific use condition of the spectacle lens as well as a model of the physiological visual properties of the wearer of the spectacle lens.

Particularly, the optical spectacle lens design may comprise a distribution of optical power across an effective area of a spectacle lens as perceived by a predetermined wearer of the spectacle lens for a predetermined as-worn position relative to the wearer's (model) eye and a predetermined object distance model. The calculation of the distribution of the optical power is based on the distance and orientation of the spectacle lens relative to the model eye, the distance and orientation of the spectacle lens relative to the model object as well as physiological parameters of the spectacle wearer such as the wearer's visual deficiencies, e.g., the wearer's ametropia, the wearer's ability to accommodate, and the wearer's pupillary distance.

The term geometric spectacle lens design means the geometry of the spectacle lens providing the calculated optical properties of a spectacle lens described in the forgoing for the spectacle wearer.

The term target optical spectacle lens design means, a draft optical spectacle lens design, the optical properties of which correspond to or are equal to target optical properties. The term actual optical spectacle lens design means calculated optical properties of a spectacle lens being received as a result of an optimization process/calculation aiming to achieve the target optical spectacle lens design as close as possible. Such an optimization process/calculation in particular for progressive spectacle lenses or customized single vision lenses is e.g., disclosed in Werner Köppen: Konzeption and Entwicklung von Progressivgläsern, in Deutsche Optiker Zeitung DOZ 10/95, S. 42-46.

Such optical or geometric spectacle lens designs may be stored on a computer-readable (e.g., non-transitory and/or electronic and/or optical) data carrier. Moreover, spectacle lenses manufactured according to the spectacle lens design can be considered physical representations of the spectacle lens design.

Essential steps of an example of a method for designing a spectacle lens are outlined in the following:

In a first step, individual user data or application data of the spectacle wearer are recorded. This includes the acquisition of (physiological) data that can be assigned to the spectacle wearer and the acquisition of usage conditions under which the spectacle wearer will wear the spectacles to be designed.

The physiological data of the spectacle wearer may include e.g., the wearer's ametropia and the wearer's ability to accommodate, which are determined by means of a refraction measurement and which are regularly included in a prescription in the form of prescription values for sphere, cylinder, axis, prism and base as well as addition. Furthermore, e.g., the pupillary distance and the pupil size were determined under different lighting conditions. The age of the wearer has an influence on the ability to accommodate and pupil size and may therefore also be taken into consideration. The convergence behavior of the eyes results from the pupillary distance for different viewing directions and object distances.

The conditions of use include the as-worn position of the spectacle lenses in front of the eye (usually in relation to the eye's pivot point) and the object distances for different viewing directions under which the spectacle wearer should see clearly. The seat of the spectacle lenses in front of the eye can e.g., be determined by recording the corneal vertex distance as well as anterior and lateral inclination. These data are included in an object distance model, for which a ray tracing method can be applied.

In a subsequent step, a draft design for the spectacle lens with a large number of evaluation points is determined on the basis of this recorded data. The draft design includes target optical properties for the spectacle lens at the respective evaluation point. The target properties include e.g., the permissible deviation from the prescribed spherical and astigmatic power, taking into account the addition, distributed over the entire spectacle lens, as specified by the arrangement of the lens in front of the eye and the underlying distance model.

Furthermore, a design of surface geometries for the front and back surfaces as well as a design for a refractive index distribution over the entire spectacle lens are specified. E.g., the front surface can be selected as a spherical surface and the back surface as a varifocal surface. Both surfaces could also initially be selected as spherical surfaces. The choice of surface geometry for the first draft generally only determines the convergence (speed and success) of the optimization method used. It should be assumed, for example, that the front surface is to retain the spherical shape and the back surface is given the shape of a varifocal surface.

In a further step, the course of main rays is determined through the large number of evaluation points. Possibly, a local wavefront can be established for each of the main rays in a vicinity of the respective main ray. According to Werner Köppen: Design and Development of Progressive Lenses, in Deutsche Optiker Zeitung DOZ 10/95, pp. 42-46, the number of evaluation points is usually in the range between 1000 and 1500. EP 2 115 527 B1 suggests a number of over 8000 evaluation points. Although the refractive index is usually dependent on the wavelength, the dispersion is generally not taken into account and the calculation is carried out for a so-called design wavelength. However, it cannot be ruled out that an optimization process takes different design wavelengths into account, e.g., is described in EP 2 383 603 B1.

In a subsequent step, the above optical properties of the spectacle lens at the evaluation points are determined by determining an influence of the spectacle lens on the beam path of the main rays and, if necessary, the local wavefronts in the vicinity of the respective evaluation point.

In a further step, the design of the spectacle lens is evaluated depending on the determined optical properties and the individual user data. The back surface geometry and as the case may be the refractive index distribution of the design of the spectacle lens may be modified by minimizing a target function such as e.g., $$F = \sum_m P_m \sum_n W_n (T_n - A_n)^2$$

where $P_m$ represents the weighting at the evaluation point m, $W_n$ the weighting of the optical property n, $T_n$ the target value of the optical property n at the respective evaluation point m and $A_n$ denotes the actual value of the optical property n at the evaluation point m.

In other words, the local surface geometry of the back surface and as the case may be the local refractive index of the spectacle lens in the respective visual beam path are modified by the evaluation points until a termination criterion is met.

According to the disclosure, a spectacle lens design for a spectacle lens is provided.

According to a first aspect of the disclosure, the spectacle lens design includes an aperture which has a dioptric power and at least two ring-shaped focusing structures which surround the aperture and which provide an additional power relative to the dioptric power provided by the aperture. A ring-shaped diffuser is arranged between neighboring ring-shaped focusing structures.

According to the first aspect of the disclosure, neighboring ring-shaped focusing structures adjoin each other with a diffuser between them.

The following options are existent:

a) the neighboring ring-shaped focusing structures adjoin each other with a ring-shaped contact line between them each providing a ring shaped focal line, where the ring-shaped contact line forms the diffuser b) the neighboring ring-shaped focusing structures adjoining each other each consist of lenslets that adjoin each other so as to form a ring of lenslets and to provide a plurality of foci along a ring shaped line, where the diffuser fills the space between the neighboring ring-shaped focusing structures c) one of the neighboring ring-shaped focusing structures adjoining each other provides a ring shaped focal line and another of the neighboring ring-shaped focusing structures adjoining each other consists of lenslets that adjoin each other so as to form a ring of lenslets and to provide a plurality of foci along a ring shaped line, where the diffuser fills the space between the neighboring ring-shaped focusing structures.

According to a second aspect of the disclosure, at least one of the ring-shaped focusing structures provides a ring shaped focal line, and neighboring ring-shaped focusing structures are arranged at a distance to each other. The ring-shaped diffuser contiguously adjoins the neighboring ring-shaped focusing structures.

According to a third aspect of the disclosure, at least one of the ring-shaped focusing structures consists of lenslets that adjoin each other so as to form a ring of lenslets and provides a plurality of foci along a ring shaped line, and neighboring ring-shaped focusing structures are formed at a distance to each other. The ring-shaped diffuser contiguously adjoins the neighboring ring-shaped focusing structures.

There are three options, namely:

Alternative B1: ring-shaped focusing structure providing a ring-shaped focal line neighbored to ring-shaped focusing structure providing a ring-shaped focal line and diffuser in between, Alternative B2: focusing structures providing a plurality of foci along a ring-shaped line neighbored to focusing structures providing a plurality of foci along a ring-shaped line and diffuser in between, and Alternative B3: ring-shaped focusing structure providing a ring-shaped focal line neighbored to focusing structures providing a plurality of foci along a ring-shaped line and diffuser in between.

According to a fourth aspect of the disclosure, the innermost ring-shaped focusing structure directly adjoins the aperture, and the ring-shaped diffuser fills the area between neighboring ring-shaped focusing structures.

The inventive spectacle lens design may be a spectacle lens design for a single vision spectacle lens, in particular for a single vision spectacle lens with an aperture that is centered on the optical axis of the single vision spectacle lens.

The idea of the present disclosure is to replace the plurality of microlenses/lenslets described, for example, in US 2017/131567 A1 or EP 3 553 594 A1, EP 3 561 578 A1, WO 2019/166653 A1, WO 20191/66654 A1, WO 2019/166655 A1, WO 2019/166657 A1, WO 2019/166659 A1 and WO 2019/206569 A1 by preferably concentrically arranged ring-shaped focusing structures. The ring-shaped focusing structures may be of any curved shape, for example circular or elliptical or of a similar curved shape, and may, preferably, be symmetric with respect to at least one axis. A ring-shaped focusing structure may be based on a torus-like structure or any other three-dimensional closed structure surrounding a structure-free zone which is cut in tow pieces along a straight or curved surface such that both pieces are still ring-shaped. The ring-shaped focusing structure may then be represented by one of the two pieces. For example, a ring-shaped focusing structure may represent a piece of a torus or any other three-dimensional ring-shaped structure at which one arrives by cutting the torus or the other ring-shaped structure along a surface corresponding to a surface of the spectacle lens. The three-dimensional closed structure surrounding a structure-free zone on which the ring-shaped focusing structure are based may in particular be symmetric in two planes perpendicular to each other like, for example, a ring torus, which shows rotational symmetry in such planes. The cross-section of one ring-shaped focusing structure is typically identical along the complete ring. The cross-sections of at least two ring-shaped focusing structures have typically the same shape (e.g., being a circular or elliptical section) and typically have identical size. The shapes of the cross-sections of all ring-shaped focusing structures are typically identical. In addition, the size of all cross-sections of all ring-shaped focusing structures may be identical. As an alternative, a ring-shaped focusing structure may be formed by lenslets which have their centers located on ring-shaped line and which adjoin each other.

The disclosure provides a spectacle lens design in which not only the ring-shaped focusing structures but also the zones between ring-shaped focusing structures are effective in at least retarding myopia progression. While the ring-shaped focusing structures are effective in at least retarding myopia progression due to providing a myopic defocus the ring-shaped zone between two ring-shaped focusing structures is effective in at least retarding myopia progression due to reducing contrast by means of the diffuser being formed in this ring-shaped zone. Moreover, the inventive spectacle lens design allows for manufacturing a corresponding spectacle lens in a two-step process by providing a spectacle lens without the ring-shaped focusing structures and then applying the ring-shaped focusing structures to a surface of the spectacle lens. This can be done without amending the whole surface of the spectacle lens design. In addition, with using ring-shaped focusing structures providing a ring-shaped focal line the number of structure elements to be applied on the surface is considerably reduced as compared to using microlenses/lenslets. When using ring-shaped focusing structures which consist of lenslets that that adjoin each other so as to form a ring of lenslets and provide a plurality of foci along a ring shaped line, i.e., when the lenslets are arranged along a one-dimensional structure, the locations of the lenslets can be described by less parameter as compared to lenslets which are arranged in a two-dimensional array. Hence, the fabrication technology is considerably simplified in case of producing a spectacle lens based on the inventive spectacle lens design as compared to the spectacle lens designs according to the state of the art.

According to the first aspect of the disclosure, in which the ring-shaped contact lines forms the ring-shaped diffuser, the ring-shaped diffuser is formed simultaneously with forming the ring-shaped focusing structures as the contact line forms a scattering center. Hence, an additional step of forming the diffuser is not necessary. However, although the number of diffusers can be increased by increasing the number of ring-shaped focusing structures and, thus, the number of ring-shaped contact lines this option does not allow changing the width of the diffuser.

According to the second and third aspects of the disclosure, in which neighboring ring-shaped focusing structures are arranged at a distance to each other, the ring-shaped diffuser is present between the neighboring ring-shaped focusing structures and contiguously adjoins the neighboring ring-shaped focusing structures. This option provides for an additional design parameter in the spectacle lens design, namely the width of the diffuser. However, compared to the first aspect of the disclosure this comes along with an additional manufacturing step, namely with a step of forming scattering centers in the ring-shaped zone which shall form the diffuser.

According to the fourth aspect of the disclosure there is no diffuser present between the aperture and the innermost focusing structure. Diffusers are suspected to act as a promotor of myopia in WO 2005/055891 A1. Therefore, preventing the diffuser from coming too close to the aperture by keeping the area inside the innermost focusing structure free of the diffuser may prevent from unintentionally promoting myopia.

According to all aspect of the disclosure, the at least two ring-shaped focusing structures may provide an additional power of at least 0.5 dpt. Having an additional power of at least 0.5 dpt. prevents the focusing structures from providing too low an additional power.

In an advantageous further development of the inventive spectacle lens design the at least two of the ring-shaped focusing structures provide a myopic defocus at the same distance to the fovea. By this measure, ghosting and halos in peripheral vision can be avoided.

In the inventive spectacle lens design the ring-shaped focusing structures and the diffuser may be present at the back surface of the spectacle lens. This allows for a manufacturing process in which a semi-finished blank is used. Such a semi-finished blank typically has an already finished front surface and is only machined on the back surface in order to manufacture a spectacle lens. Having the ring-shaped focusing structures at the back surface of the spectacle lens design makes it possible to integrate the application of the ring-shaped focusing and the diffuser structures into a manufacturing process using a semi-finished blank.

In addition, in accordance with the disclosure, a method of manufacturing a spectacle lens to be positioned relative to the eye of a wearer is provided. The method includes forming at least a part of a spectacle lens such as to provide a dioptric power, and forming at least two ring-shaped focusing structures providing an additional power relative to the dioptric power such that the at least two ring-shaped focusing structures surround an aperture providing said dioptric power. A ring-shaped diffuser is formed between neighboring ring-shaped focusing structures.

According to the first aspect of the disclosure, neighboring ring-shaped focusing structures are formed such as to adjoin each other with a ring-shaped contact line between them where the contact line forms the ring-shaped diffuser.

According to the second aspect of the disclosure, at least one of the ring-shaped focusing structures is formed such as to provide a ring shaped focal line, and neighboring ring-shaped focusing structures are formed at a distance to each other. The ring-shaped diffuser is formed such as to contiguously adjoin the neighboring ring-shaped focusing structures.

According to the third aspect of the disclosure, at least one of the ring-shaped focusing structures is formed such as to consist of lenslets that adjoin each other so as to form a ring of lenslets and to provide a plurality of foci along a ring shaped line, and neighboring ring-shaped focusing structures are formed at a distance to each other. The ring-shaped diffuser is formed such as to contiguously adjoin the neighboring ring-shaped focusing structures.

According to the fourth aspect of the disclosure, the innermost ring-shaped focusing structure is formed such that it directly adjoins the aperture, and the ring-shaped diffuser is formed such that it fills the area between the ring-shaped focusing structures.

The inventive method may be used for manufacturing a single vision spectacle lens, in particular a single vision spectacle lens with an aperture that is centered on the optical axis of the single vision spectacle lens.

The inventive method allows for manufacturing a spectacle lens with at least two ring-shaped focusing structures which is improved such as compared to the spectacle lens disclosed in WO 2019/166657 A1 that its effectivity in stopping or slowing down myopia is increased. The increase of effectivity is due to the diffuser present between neighboring ring-shaped focusing structures, as has been discussed above. In addition, the inventive method allows for manufacturing a spectacle lens with at least two ring-shaped focusing structures without amending the whole surface of the spectacle lens design. In addition, with using ring-shaped focusing structures the number of structure elements to be applied on the surface is considerably reduced as compared to using microlenses/lenslets. Moreover, when using ring-shaped focusing structures which consist of lenslets that adjoin each other so as to form a ring of lenslets and provide a plurality of foci along a ring shaped line, i.e., when the lenslets are arranged along a one-dimensional structure, the locations of the lenslets can be described by less parameter as compared to lenslets which are arranged in a two-dimensional array. Hence, the inventive method allows for manufacturing spectacle lens with at least two ring-shaped focusing structures by means of a fabrication technology that is considerably simplified as compared to the state of the art.

According to the first aspect of the disclosure, in which neighboring ring-shaped focusing structures are formed such as to adjoin each other with a ring-shaped contact line between them, the ring-shaped diffuser is formed simultaneously with forming the ring-shaped focusing structures as the contact line forms a scattering center. Hence, an additional step of forming the diffuser is not necessary. However, although the number of diffusers can be increased by increasing the number of ring-shaped focusing structures, and thus the number of ring-shaped contact lines, adjoining ring-shaped focusing structures do not allow for changing the width of the diffuser. Therefore, as an alternative, the neighboring ring-shaped focusing structures may be formed at a distance to each other. Then, according to the second and third aspects of the disclosure, the ring-shaped diffuser is formed between the ring-shaped focusing structures so as to contiguously adjoin the ring-shaped focusing structures. The distance between neighboring ring-shaped focusing structures provides for an additional design parameter in the spectacle lens design, namely the width of the diffuser. However, compared to the first option this comes at the cost of an additional manufacturing step, namely with a step of forming scattering centers in the ring-shaped zone which, at the end, forms the diffuser. Producing the scattering centers may, for example, be done by means of a laser generating a plurality of point-shaped depressions, e.g., similar to those disclosed in WO 2010/075319 A2, WO 2018/026697 A1, WO 2019/152438 A1, and WO 2020/014613 A1, respectively.

Forming no diffuser between the aperture and the innermost focusing structure, as it is done according to the fourth aspect of the disclosure, may prevent from a unintentional promotion of myopia by having a diffuser too close to the aperture. Diffusers are suspected to act as a promotor of myopia in WO 2005/055891 A1.

The least two ring-shaped focusing structures may be formed such that the additional power that is provided by the ring-shaped focusing structures is at least 0.5 dpt. Having an additional power of at least 0.5 dpt. prevents the focusing structures from providing a too low additional power.

In order to allow integrating the application of the ring-shaped focusing structures and the diffuser into a manufacturing process using a semi-finished blank with a finished front surface the at least two ring-shaped focusing structures may be formed on the back surface of the spectacle lens.

In a specific development of the inventive method, first a spectacle lens providing a focal power that forms a focused image on the fovea in the as-worn position is formed and then the at least two ring-shaped focusing structures are applied to a surface of said spectacle lens so as to surround an aperture of said spectacle lens which becomes the part of the spectacle lens which provides said focal power that forms a focused image on the fovea. The at least two ring-shaped focusing structures may be applied to a surface of the spectacle lens by means of one of the following processes: Molding, additive manufacturing, and swelling. This specific development of the inventive method allows for stockpiling spectacle lenses providing a focal power that forms a focused image on the fovea in the as-worn position and applying the ring-shaped focusing structures on a surface of such a stockpiled spectacle lens.

As an alternative, the at least two ring-shaped focusing structures may be formed by means of a material removing process such as cutting. This allows for forming the part of the spectacle lens which provides said focal power that forms a focused image on the fovea and the at least two ring-shaped focusing structures in the same manufacturing step.

Moreover, in further accordance with the disclosure, a computer-implemented method of providing a spectacle lens design for at least retarding myopia progression is provided. The method includes the steps of determining a spectacle lens with a dioptric power, and determining at least two ring-shaped focusing structures to be positioned on the spectacle lens so as to surround an aperture providing the dioptric power where the ring-shaped focusing structures provide an additional power relative to the dioptric power. The at least two ring-shaped focusing structures are determined to be positioned with a ring-shaped diffuser arranged between them.

According to the first aspect of the disclosure, the at least two of the ring-shaped focusing structures are determined such that neighboring ring-shaped focusing structures adjoin each other with a ring-shaped contact line between them which forms the ring-shaped diffuser.

According to the second aspect of the disclosure, at least one of the ring-shaped focusing structures is determined such that it provides a ring shaped focal line, and neighboring ring-shaped focusing structures are arranged at a distance to each other. The ring-shaped diffuser is determined such as to contiguously adjoin the neighboring ring-shaped focusing structure.

According to the third aspect of the disclosure, at least one of the ring-shaped focusing structures is determined such as to consist of lenslets that adjoin each other so as to form a ring of lenslets and to provide a plurality of foci along a ring shaped line, and neighboring ring-shaped focusing structures are determined such as to be located at a distance to each other. The ring-shaped diffuser is determined such as to contiguously adjoin the neighboring ring-shaped focusing structures.

According to the fourth aspect of the disclosure, the innermost ring-shaped focusing structure is determined such that it directly adjoins the aperture, and the ring-shaped diffuser is determined such that it fills the area between the ring-shaped focusing structures.

The spectacle lens provided by the inventive method may be a single vision spectacle lens, in particular a single vision spectacle lens with an aperture that is centered on the optical axis of the single vision spectacle lens. Alternatively, the spectacle lens may be a progressive lens with an aperture centered on or in the vicinity (e.g., distance less than 2 mm) to the near design reference point (acc. to Sec. 3.2.18 of DIN EN ISO 13666:2019) or the near reference point (acc. to Sec. 3.2.21 of DIN EN ISO 13666:2019) or the near optical center (acc. to Sec. 3.16.8 of DIN EN ISO 13666:2019) of the progressive spectacle lens.

The inventive method of providing a spectacle lens design for at least retarding myopia progression provides a spectacle lens in which not only the ring-shaped focusing structures but also the zones between ring-shaped focusing structures are effective in at least retarding myopia progression. While the ring-shaped focusing structures are effective in at least retarding myopia progression due to providing a myopic defocus the ring-shaped zone between two ring-shaped focusing structures is effective in at least retarding myopia progression due to reducing contrast by means of the diffuser being formed in this ring-shaped zone. As a consequence, the inventive method of providing a spectacle lens design allows for providing a spectacle lens design with increased effectivity in stopping or slowing down myopia as compared to the spectacle lens design disclosed in WO 2019/166657 A1.

When, according to the first aspect of the disclosure, the at least two of the ring-shaped focusing structures are determined such that neighboring ring-shaped focusing structures adjoin each other with a ring-shaped contact line between them which forms a ring-shaped diffuser the ring-shaped diffuser can be formed simultaneously with forming the ring-shaped focusing structures as the contact line forms a scattering center. On the other hand, when according to the second and third aspects of the disclosure the at least two of the ring-shaped focusing structures are determined such that neighboring ring-shaped focusing structures are arranged at a distance to each other and the ring-shaped diffuser is present between and contiguously adjoins the ring-shaped focusing structures the distance between neighboring ring-shaped focusing structures provides for an additional design parameter in the spectacle lens design, namely the width of the diffuser.

Determining the spectacle lens design such that no diffuser is formed between the aperture and the innermost focusing structure, as it is done according to the fourth aspect of the disclosure, may prevent from unintentional promotion of myopia by having a diffuser too near to the aperture. Diffusers are suspected to act as a promotor of myopia in WO 2005/055891 A1.

In a further development of all aspects of the disclosure, the at least two ring-shaped focusing structures may be determined such that the additional power that is provided by the ring-shaped focusing structures is at least 0.5 dpt. Having an additional power of at least 0.5 dpt. prevents the focusing structures from providing too low of an additional power.

In an advantageous development of the inventive method, the at least two of the ring-shaped focusing structures are determined such that they provide a myopic defocus at the same distance to the fovea. By this measure, ghosting and halos in peripheral vision can be avoided. In a further development of the inventive method, the at least two ring-shaped focusing structures are determined such as to allow them to be formed on the back surface of the spectacle lens. This allows for integrating the formation of the ring-shaped focusing structures and the diffuser into a manufacturing process using a semi-finished blank with a finished front surface.

Furthermore, determining the spectacle lens with a dioptric power and determining the at least two ring-shaped focusing structures may be based on measured eye-data, which allows for individualizing the determined spectacle lens design.

It shall be pointed out here, that ring-shaped focusing structures and ring-shaped diffusing structures can be located on the same surface of the spectacle lens or even be formed on opposite surfaces of the spectacle lens. Such combined structures can even be located on both sides of the spectacle lens. In addition, it is possible to locate the ring-shaped focusing structures within the spectacle lens my means of a refractive index variation in the spectacle lens material.

A part of the area of the surface/surfaces or the complete surface/surfaces comprising the focusing and diffusing structures may be coated as usual with respective functional coatings such as hard coatings, anti-reflective coatings, clean-coatings, anti-fog-coatings, anti-static coatings, anti-bacterial coatings, anti-viral-coatings, etc.

According to further aspect of the disclosure, a data set comprising at least one kind of the following kinds of data: (i) a numerical representation of the inventive spectacle lens design and (ii) data containing computer-readable instructions for controlling one or more manufacturing machines in order to produce a spectacle lens according to the inventive spectacle lens design.

According to still further aspect of the disclosure, a data carrier signal carrying at least one kind of the following kinds of data is provided: (i) a numerical representation of the inventive spectacle lens design and (ii) data containing computer-readable instructions for controlling one or more manufacturing machines in order to produce a spectacle lens according to the inventive spectacle lens design.

Such a data set or such a data carrier signal may e.g., be provided by a cloud server via a network and can be used in a computer numerically controlled manufacturing process to manufacture a spectacle lens based on the spectacle lens design.

Further features, properties and advantages of the present disclosure will become clear from the following description of exemplary embodiments of the disclosure I conjunction with the accompanying drawings.

BRIEF DESCRIPTION OF THE DRAWINGS

The disclosure will now be described with reference to the drawings wherein.

DESCRIPTION OF EXEMPLARY EMBODIMENTS

Figure 1:
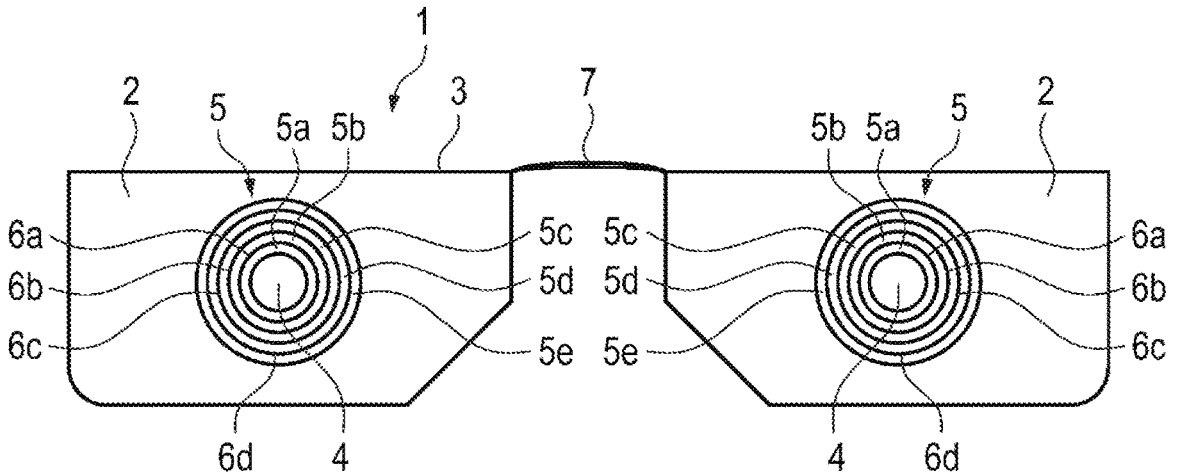
FIG. 1 shows a first exemplary embodiment of a spectacle lenses according to a spectacle lens design with ring-shaped focusing structures in a plan view.

Exemplary embodiments of the inventive spectacle lens design will be described with respect to FIGS. 1 to 5 and 8 to 11. These figures show exemplary embodiment of spectacle lenses based on various inventive spectacle lens designs.

In all exemplary embodiment, the spectacle lenses (denominated by reference numerals 2, 12, and 22 in FIGS. 1 to 5) include at least two ring-shaped focusing structures 5a-e, 15a-e, 25a-d in the peripheral zone of the spectacle lens 2, 12, 22. The ring-shaped focusing structures 5a-e, 15a-e, 25a-d surround an aperture 4, 14, 24 that represents an inner central zone of the spectacle lens 2, 12, 22. This inner central zone is, in the present embodiments, a clear zone having distance vision-correcting properties according to a prescription. It may alternatively be a clear zone having near vision-correcting properties. The ring-shaped focusing structures 5a-e, 15a-e, 25a-d are designed to provide an additional power relative to the dioptric power provided by the clear zones formed by the apertures 4, 14, 24 of the spectacle lenses 2, 12, 22 by at least 0.5 dpt, regularly in the range between 0.5 dpt to 5 dpt. As a consequence, the ring-shaped focusing structures 5a-e, 15a-e, 25a-d provide a myopic defocus to the periphery of the retina when the wearer looks through the aperture 4, 14, 24 and while the eye lens focuses to the foveal area. At least two of the ring-shaped focusing structures 5a-e, 15a-e, 25a-d may provide a myopic defocus being located at the same distance from the retina if the wearer focuses to the foveal area when viewing through the aperture 4, 14, 24. In particular, all of the ring-shaped focusing structures 5a-e, 15a-e, 25a-d may provide a myopic defocus being located at the same distance from the retina if the wearer focuses to the foveal area when viewing through the aperture 4, 14, 24.

In the spectacle lenses 2, 12, 22 of all exemplary embodiments, the aperture 4, 14, 24 may have an expansion between 3 mm and 30 mm. In the case of a circular shaped aperture 4, as in the exemplary embodiment shown in FIGS. 1 and 2, the diameter will be between 4 mm and 8 mm. In case of an elliptical aperture 14, 24, as in the exemplary embodiment shown in FIGS. 3 to 5) the short diameter is in the range between 4 mm and 8 mm and the long diameter is at least greater than the short diameter, typically at least twice the short diameter but up to 30 mm.

The ring-shaped focusing structures 5a-e, 15a-e, 25a-d may cover the whole spectacle lens 2, 12, 22 except of the aperture 4, 14, 44. The ring-shaped focusing structures 5a-e, 15a-e, 25a-d are typically—but not necessarily—located on or in the back surface 2b, 22b of the spectacle lens 2, 12, 22. In alternative embodiments the ring-shaped focusing structures 5a-e, 15a-e, 25a-d may also be located on or in the front surface of the spectacle lens 2, 12, 22. The front surface 2a, 22a of the spectacle lens 2, 12, 22 may have a spherical or rotationally symmetric aspheric contour.

The material the ring-shaped focusing structures 5a-e, 15a-e, 25a-d are made of may be identical with the material used for fabricating the substrate material of the spectacle lens 2, 12, 22. However, there is also the possibility that some or all ring-shaped focusing structures 5a-e, 15a-e, 25a-d are made of a different material as compared to the substrate material of the spectacle lens 2, 12, 22.

The ring-shaped focusing structures 5a-e, 15a-e, 25a-d may be fabricated by first providing a spectacle lens 2, 12, 22 providing a focal power that forms a focused image on the fovea in the as-worn position and then the applying at least two ring-shaped focusing 5a-e, 15a-e, 25a-d structures to a surface of said spectacle lens 2, 12, 22. The at least two ring-shaped focusing structures 5a-e, 15a-e, 25a-d may be applied to a surface of the spectacle lens by means of one of the following processes: Molding, additive manufacturing, and swelling, such as, for example, oleic acid swelling. In the latter, the substrate material of the spectacle lens would be an organic material and an oleic acid would be applied to the areas of front or back surface of the spectacle lens which causes the organic material to swell. An example for a suitable additive manufacturing processes for applying the ring-shaped focusing structures to a surface of said spectacle lens is inkjet-printing may also be used. However, instead of providing a spectacle lens and applying the ring-shaped focusing structures 5a-e, 15a-e, 25a-d to a surface of said spectacle lens the ring-shaped focusing structures may also be fabricated by means of cutting or similar material-removing processes. This kind of fabrication may be done simultaneously with the fabrication of the surface of the spectacle lens which shall contain the ring-shaped focusing structures.

A part of the area of the surface/surfaces or the complete surface/surfaces comprising the focusing and diffusing structures may be coated as usual with respective functional coatings such as hard coatings, anti-reflective coatings, clean-coatings, anti-fog-coatings, anti-static coatings, anti-bacterial coatings, anti-viral-coatings, etc.

In all exemplary embodiment, the innermost ring-shaped focusing structure directly adjoins the aperture and, in case neighboring ring-shaped focusing structures are arranged at a distance to each other, the ring-shaped diffuser fills the whole area between the neighboring ring-shaped focusing structures. No diffuser is overlapping the ring-shaped focusing structures.

Figure 2:
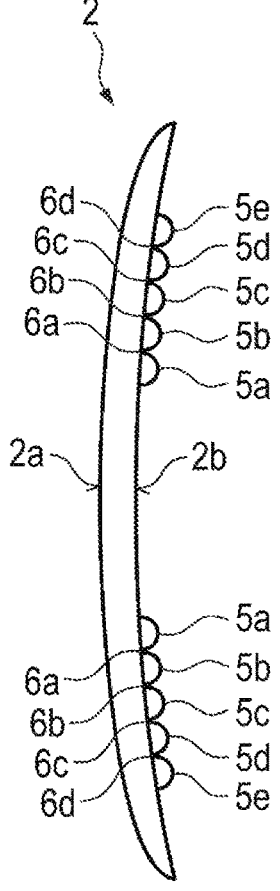
FIG. 2 shows the spectacle lens design of the first exemplary embodiment in a side view.

A first exemplary embodiment of the inventive spectacle lens design will be described with respect to FIGS. 1 and 2. FIG. 1 shows spectacles 1 with spectacle lenses 2 manufactured according to the first exemplary embodiment of inventive spectacle lens design in a plan view. The spectacle lenses 2 can be regarded as representative for the spectacle lens design of the first exemplary embodiment. FIG. 2 shows one of the spectacle lenses 2 in a side view.

The spectacles 1 comprise two spectacle lenses 2, one for the right eye of the wearer and one for the left eye of the wearer. The two spectacle lenses 2 are mounted in a spectacle frame 3 and separated by the bridge 7 of the spectacle frame 3. Each of the spectacle lenses 2 comprises an aperture 4 which forms a clear zone for viewing objects. The aperture 4 is circular in shape in the present exemplary embodiment. The aperture 4 provides for far vision full correction. This means that independent of the distance the viewed object is located the wearer may (assisted by accommodation) clearly view, i.e., in the center area of the retina (foveal region) a sharp focus may be generated. The front surfaces 2a of the spectacle lenses 12 are spherical in the present exemplary embodiment.

As shown in FIG. 2, to the back surfaces 2b of the spectacle lenses 2 five ring-shaped focusing structures 5a, 5b, 5c, 5d, 5e are applied in the peripheral zone 5 of the spectacle lens 2. Applying the ring-shaped focusing structures 5a, 5b, 5c, 5d, 5e can be done by any of the fabrication processes mentioned above. In the present exemplary embodiment, all five ring-shaped focusing structures 5a, 5b, 5c, 5d, 5e have an identical cross-section, which is a section of a circle. There is a contiguous connection 6a, 6b, 6c, 6d between adjacent ring-shaped focusing structures 5a, 5b; 5b, 5c; 5c, 5d; 5d, 5e. Each contiguous connection 6a, 6b, 6c, 6d forms a line-shaped scattering center and can, therefore be seen as a line-shaped diffuser.

Each ring-shaped focusing structure 5a, 5b, 5c, 5d, 5e provides a ring-shaped focal line, which is, if the eye focuses in the center of the optical axis of the eye onto the retinal surface, peripherally myopic defocused as compared to the focus in the central region of the retina.

Figure 3:
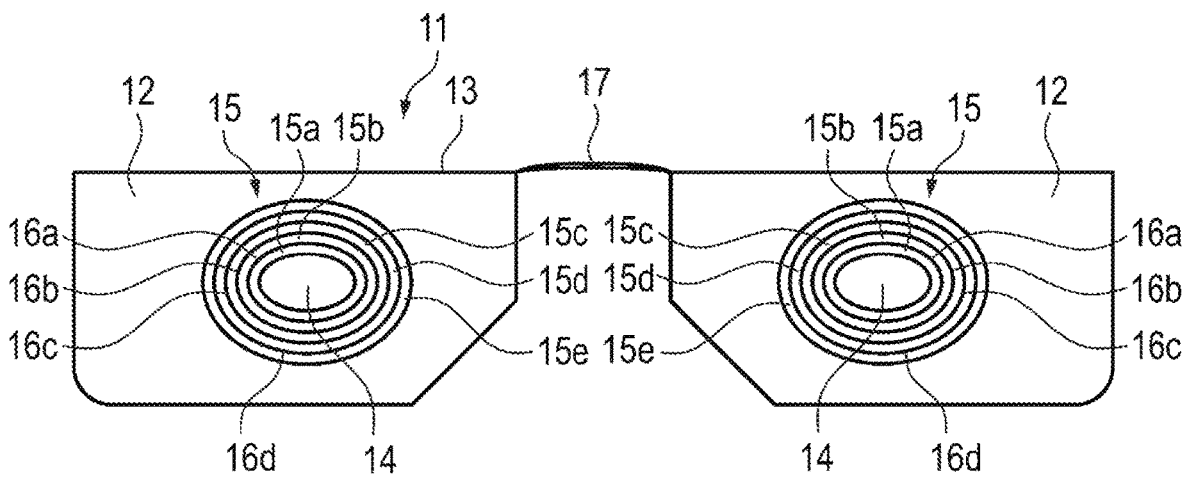
FIG. 3 shows a second exemplary embodiment of a spectacle lenses according to a spectacle lens design with ring-shaped focusing structures in a plan view.

A second exemplary embodiment of the inventive spectacle lens design will be described with respect to FIG. 3. FIG. 3 shows spectacles 11 with spectacle lenses 12 manufactured according to the second exemplary embodiment of the inventive spectacle lens design in a plan view. The spectacle lenses 12 can be regarded as representative for the spectacle lens design of the second exemplary embodiment.

The spectacles 11 comprise two spectacle lenses 12, one for the right eye of the wearer and one for the left eye of the wearer. The two spectacle lenses 12 are mounted in a spectacle frame 13 and separated by the bridge 17 of the spectacle frame 13. Each of the spectacle lenses 12 comprises an aperture 14 which forms a clear zone for viewing objects. The aperture 14 of the present exemplary embodiment is elliptical in shape and provides for far vision full correction. This means that independent of the distance the viewed object is located the wearer may (assisted by accommodation) clearly view, i.e., in the center area of the retina (foveal region) a sharp focus may be generated. The front surfaces of the spectacle lenses 12 are spherical in the present exemplary embodiment.

As is the first exemplary embodiment, five ring-shaped focusing structures 15*a*, 15*b*, 15*c*, 15*d*, 15*e* are applied to the back surfaces of the spectacle lenses in the peripheral zones 15 of the spectacle lenses 12. However, in difference to the ring-shaped focusing structures of the first exemplary embodiment, the five ring-shaped focusing structures 15*a*, 15*b*, 15*c*, 15*d*, 15*e* of the second exemplary embodiment are elliptical in shape and have identical cross-sections, which is a section of a circle in the present exemplary embodiment. Each spectacle lens 12 may be produced by any of the fabrication processes mentioned above.

All ring-shaped focusing structures 15*a*, 15*b*, 15*c*, 15*d*, 15*e* are contiguously connected to their respective inwardly and outwardly neighboring ring-shaped focusing structures 15*a*, 15*b*, 15*c*, 15*d*, 15*e*. Each of the contiguous connection 16*a*, 16*b*, 16*c*, 16*d* forms a ring-shaped scattering center and can, therefore be seen as a ring-shaped diffuser.

Each ring-shaped focusing structure 15*a*, 15*b*, 15*c*, 15*d*, 15*e* provides a ring-shaped elliptical focal line, which is, if the eye focuses in the center of the optical axis of the eye onto the retinal surface, peripherally myopic defocused as compared to the focus in the central region of the retina.

Figure 4:
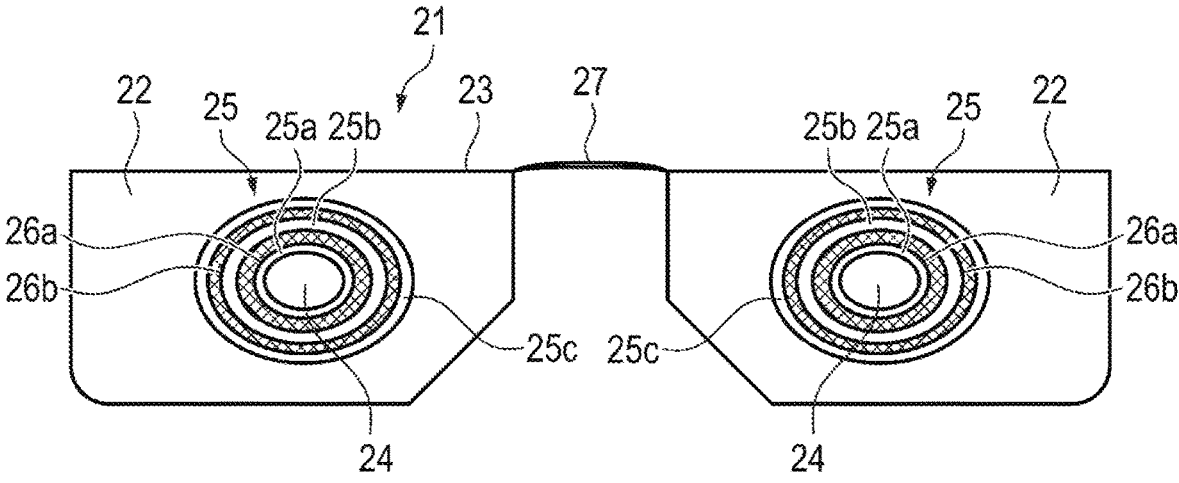
FIG. 4 shows a third exemplary embodiment of a spectacle lenses according to a spectacle lens design with ring-shaped focusing structures in a plan view.
Figure 5:
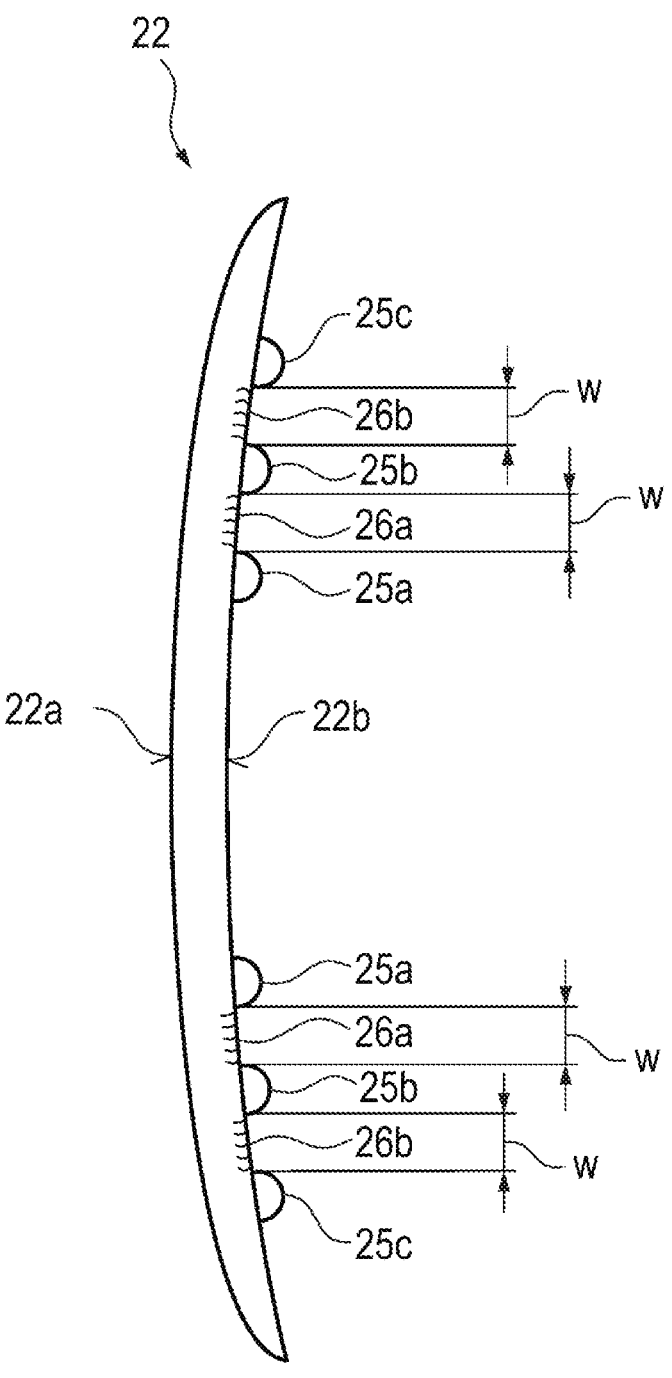
FIG. 5 shows the spectacle lens design of the third exemplary embodiment in a side view.

A third exemplary embodiment of the inventive spectacle lens design will be described with respect to FIGS. 4 and 5. FIG. 4 shows spectacles 21 with spectacle lenses 22 manufactured according to the third exemplary embodiment of the inventive spectacle lens design in a plan view. The spectacle lenses 22 can be regarded as representative for the spectacle lens design of the third exemplary embodiment. FIG. 5 shows one of the spectacle lenses 22 in a side view.

The spectacles 21 comprise two spectacle lenses 22, one for the right eye of the wearer and one for the left eye of the wearer. The two spectacle lenses 22 are mounted in a spectacle frame 23 and separated by the bridge 27 of the spectacle frame 23. Each of the spectacle lenses 22 comprises an aperture 24 forming a clear zone of the spectacle lens 22. The aperture 24 of the present exemplary embodiment is elliptical in shape and provides for far vision full correction. This means that independent of the distance the viewed object is located the wearer may (assisted by accommodation) clearly view, i.e., in the center area of the retina (foveal region) a sharp focus may be generated. The front surfaces 22*a* of the spectacle lenses 22 are spherical.

In the present exemplary embodiment three ring-shaped focusing structures 25*a*, 25*b*, 25*c* are applied to the back surfaces 22*b* of the spectacle lenses 22. The three ring-shaped focusing structures 25*a*, 25*b*, 25*c* are elliptical in shape and are spaced by two ring-shaped diffusers 26*a*, 26*b* having a width designated by "w" in FIG. 5.

Each spectacle lens 22 may be produced by casting. The ring-shaped diffusers 26*a*, 26*b* may be produced by means of a laser generating a plurality of point-shaped depressions similar to those disclosed, e.g., in WO 2010/075319 A2, WO 2918/026697 A1, WO 2019/152438 A1 and WO 2020/014613 A1, respectively.

In the present exemplary embodiment, all three ring-shaped focusing structures 25*a, b* 25*c* have an identical cross-section, which is a section of a circle. Each ring-shaped focusing structure 25*a*, 25*b*, 25*c* provides a ring-shaped elliptical focal line, which is, if the eye focuses in the center of the optical axis of the eye onto the retinal surface, peripherally myopic de-focused as compared to the focus in the central region of the retina.

Figure 6:
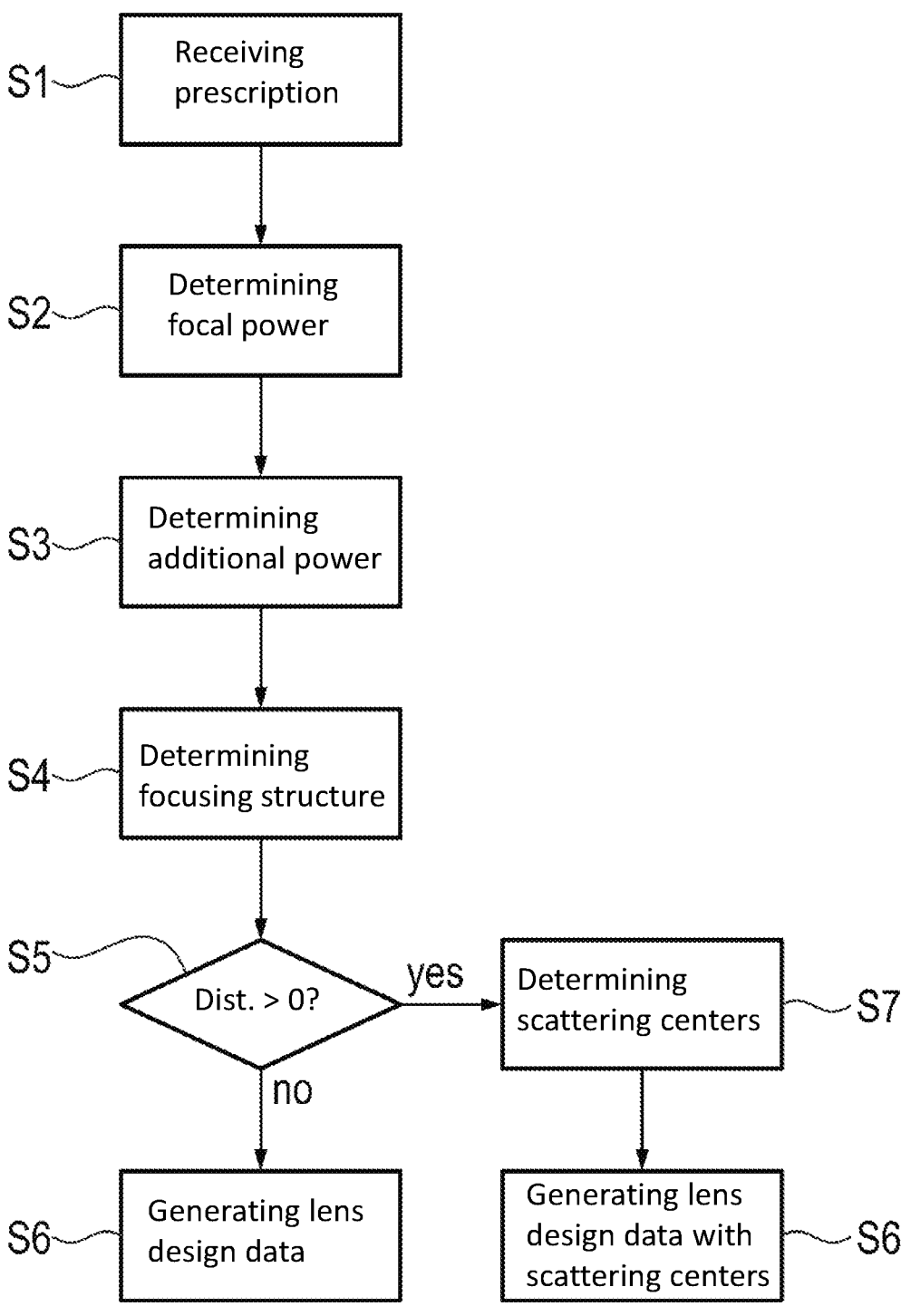
FIG. 6 shows a flow chart representing an exemplary embodiment of the method of providing a spectacle lens design for at least retarding myopia progression.
Figure 7:
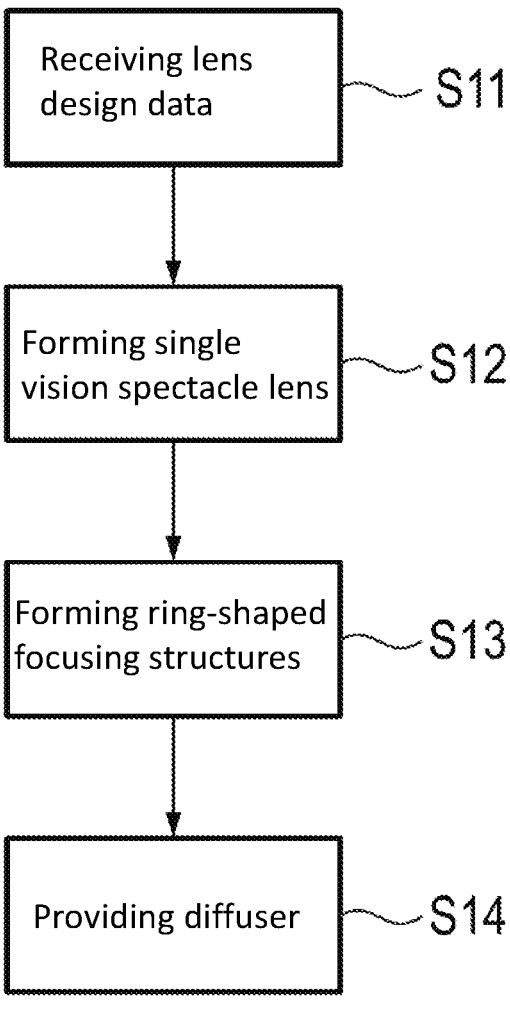
FIG. 7 shows a flow chart representing an exemplary embodiment of the method of manufacturing a spectacle with ring-shaped focusing structures.

Next, an exemplary embodiment of the inventive method of providing a spectacle lens design for at least retarding myopia progression will be described with respect to FIG. 6.

In a first step, S1, data from a prescription is received where the prescription includes a summary of the dioptric powers necessary for correcting a diagnosed refractive error. In case of a myopic eye the prescription contains at least a value "sph" for sphere. In addition, in case of an additional astigmatism it may also contain values for "cyl" for cylinder and a value "axis" for the axis of the cylinder. Further values may also present in the prescription like, for example a prism value and a corresponding base value. In the present case, the prescription also contains a value for an additional power, which shall be used for providing a myopic defocus.

In the present exemplary embodiment, the values contained in the prescription are based on a measurement performed by an eye care professional with an ametropic person, where the measurement provides for refraction data relating to the eyes of the ametropic person. The refraction data may either be objective refraction data, i.e., refraction data measured objectively by means of a refractometer or the like, or subjective refraction data. In case of subjective refraction data, this data may be collected by letting the ametropic person look at a text or at optotypes with different sizes while trying various test lenses until the ametropic person experiences a satisfying visual acuity.

However, instead of values of a prescription it would also be possible to provide the measured data in form of other suitable values, for example in form of Zernike coefficients. In addition, it would also be possible to receive the values representing objective refraction data directly from a refractometer or from any other suitable measurement apparatus.

Based on the measured data received in step S1, a spectacle lens design with a focal power that provides a focused image on the fovea (assisted by accommodation) when the wearer looks through the spectacle lens worn according to an as-worn position is determined in step S2. In case of a myopic eye the focal power would be negative to shift the focus to the fovea, which would without correction be located in front of the fovea. As a consequence, a correction for distance vision can be achieved.

In step S3 a focal power is determined, which leads to a focus in front of the fovea. This focal power can be considered as an additional power added to the focal power determined in step S2. This additional power, when added to the focal power determined in step S2, provides the myopic defocus. However, as the myopic defocus shall only be present in peripheral vision, in step S4 ring-shaped focusing structures are determined which are to be present in the peripheral zone of the spectacle lens and surround an aperture without focusing structures. As the aperture is free of the ring-shaped focusing structures it provides the focal power determined in step S2.

Determining the ring-shaped focusing structures in step S4 includes determining width and diameter of the ring-shaped focusing structures as well as their cross-sectional shape.

Moreover, step S4 includes determining the number of focusing structures of which at least two will be present, and the distance between the focusing structures. Exemplary embodiments for suitable focusing structures have been descripted with respect to FIGS. 1 to 5.

The distance between the ring-shaped focusing structures may be determined to be zero, which means that neighboring focusing structures contiguously adjoin each other. In this case, the circular line at which the ring-shaped focusing structures adjoin each other is a relative sharp line, which acts as a line-shaped scattering center and, thus, as a line-shaped diffuser.

In step S5 the method proceeds immediately to step S6 in case the distance between neighboring ring-shaped focusing structures determined in step S4 is zero. In step S6 suitable data is generated which represents the spectacle lens design and allows manufacturing a spectacle lens with the focal power determined in step S2 the additional power determined in step S3 and the ring-shaped focusing structures determined in step S4.

In case the distance between neighboring ring-shaped focusing structures is greater than zero step S5 initiates a step S7 in which suitable scattering centers for the area between the neighboring ring-shaped focusing structures are determined. The scattering centers may, for example, be in the form of point-shaped or line-shaped depressions which may, for example, be formed by a laser. By introducing the scattering centers into the annular zone between two ring-shaped focusing structures this annular zone will become a diffuser. Then, in step S6' data is generated which represents the spectacle lens design and allows for manufacturing a spectacle lens with a focal power determined in step S2, the additional power determined in step S3, the ring-shaped focusing structures determined in step S4 and the scattering centers determined in step S7.

Next, an exemplary embodiment for a method of manufacturing the spectacle lens specified in the data generated in step S6 or step S6' will be described with respect to FIG. 8.

In step S11 the data generated in step S6 or step S6' of the method of providing a spectacle lens design for at least retarding myopia progression is received. Then, in step S12 a single vision spectacle lens is formed which provides the focal power determined in step S4 of the method of providing a spectacle lens design for at least retarding myopia progression. This single vision lens can, for example, be manufactured from a semi-finished blank, which includes an already finished front surface. The back surface of the semi-finished blank is then machined so that the semi-finished blank becomes the single vision spectacle lens with the requested focal power.

Next, in step S13 a mold is set on the back surface of the single vision spectacle lens. The molding surface of the mold represents the negative shape of the ring-shaped focusing structures determined in step S4 of the method of providing a spectacle lens design for at least retarding myopia progression. It is set on the back surface of the single vision spectacle lens and then the ring-shaped focusing structures are formed on the back surface of the single vision spectacle lens by injection molding or any other suitable molding process. After the molding process a polishing process for removing any ridges remaining from the molding process may be performed. However, applying the ring-shaped focusing structures to the back surface of the single vision spectacle lens does, however, not need to be done by means of a molding process. Other processes such as, for example swelling processes like oleic acid swelling or additive manufacturing processes like inkjet printing may also be used.

In case the distance between the ring-shaped focusing structures formed on the back surface of the single vision spectacle is greater than to than zero the scattering centers determined in step S7 of the method of providing a spectacle lens design for at least retarding myopia progression are introduced into the annular zone between the neighboring ring-shaped focusing structures. This can be done by any suitable method, for example by means of a laser generating point-shaped or line-shaped depressions in the back surface of the single vision spectacle lens between the neighboring ring-shaped focusing structures. With the providing the diffuser in step S14 the spectacle lens is finished.

As first a single vision spectacle lens is formed in the exemplary embodiment this embodiment provides the opportunity to manufacture a stockpile of single vision lenses with different focal powers to which ring-shaped focusing structures are applied on demand. However, first forming a single vision spectacle lens and then applying the ring-shaped focusing structures is not mandatory. It would also be possible, to form the ring-shaped focusing structures in step S12 when the back surface of the spectacle lens is formed by means of a material removing process like cutting or the like. In case the ring-shaped focusing structures are formed by a material removing process together with the rest of the back surface of the single vision spectacle lens stockpiling of single vision lenses to which ring-shaped focusing structures are applied on demand is, however, not possible.

Although the ring-shaped focusing structures provide ring-shaped focal lines in the exemplary embodiments shown so far it would also be possible that at least one of the ring-shaped focusing structures of a spectacle lens design, and in particular each ring-shaped focusing structure of a spectacle lens design, provides a number of point-shaped or short line-shaped foci which are located on a ring-shaped line surrounding the aperture. To achieve this the ring-shaped focusing structures of the exemplary embodiments shown so far could be segmented into a number of adjoining lenslets, in particular circular or elliptic lenslets.

Figure 8:
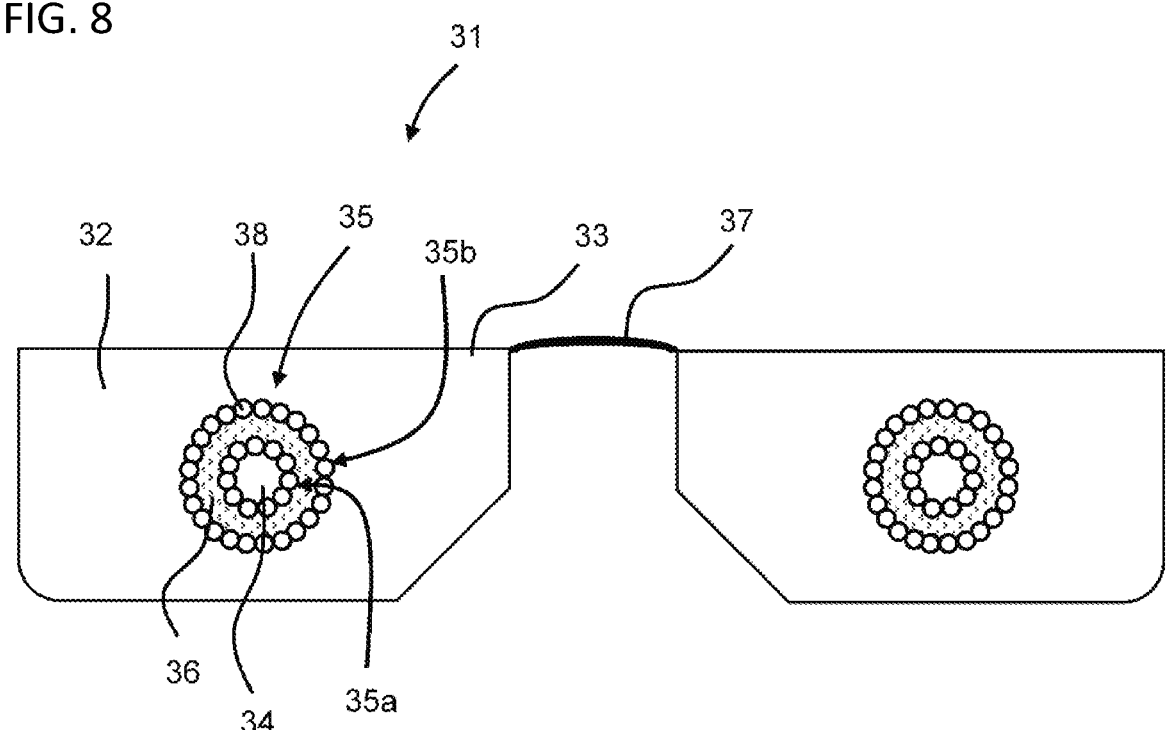
FIG. 8 shows a fourth exemplary embodiment of a spectacle lenses according to a spectacle lens design with ring-shaped focusing structures in a plan view.

A fourth exemplary embodiment in which the ring-shaped focusing structures 35a,b are formed by rings of lenslets 38 where the lenslets adjoin each other is shown in FIG. 8. Each of the lenslets 38 is spherical and provides a point shaped focus. The foci provided by the lenslets 38 are located on a ring-shaped line. Although the lenslets 38 are spherical in the present exemplary embodiment and provide a point shaped shape focus they may as well have other shapes that provide, e.g., short line shaped foci.

FIG. 8 shows spectacles 31 with spectacle lenses 32 manufactured according to the fourth exemplary embodiment of the inventive spectacle lens design in a plan view. The spectacle lenses 32 can be regarded as representative for the spectacle lens design of the fourth exemplary embodiment.

The spectacles 31 comprise two spectacle lenses 32, one for the right eye of the wearer and one for the left eye of the wearer. The two spectacle lenses 32 are mounted in a spectacle frame 33 and separated by the bridge 37 of the spectacle frame 33. Each of the spectacle lenses 32 comprises an aperture 34 forming a clear zone of the spectacle lens 32. The aperture 34 of the present exemplary embodiment is circular in shape and provides for far vision full correction. This means that independent of the distance the viewed object is located the wearer may (assisted by accommodation) clearly view, i.e., in the center area of the retina (foveal region) a sharp focus may be generated. The front surfaces of the spectacle lenses 32 are spherical.

In the present exemplary embodiment two ring-shaped focusing structures 35a, 35b are applied to the back surfaces of the spectacle lenses 32. The two ring-shaped focusing structures 35a, 35b are spaced and separated by a ring-shaped diffuser 36a.

Each spectacle lens 32 may be produced by casting. The ring-shaped diffuser 36 may be produced by means of a laser generating a plurality of point-shaped depressions similar to those disclosed, e.g., in WO 2010/075319 A2, WO 2918/026697 A1, WO 2019/152438 A1 and WO 2020/014613 A1, respectively.

Figures 9, 10, 11:
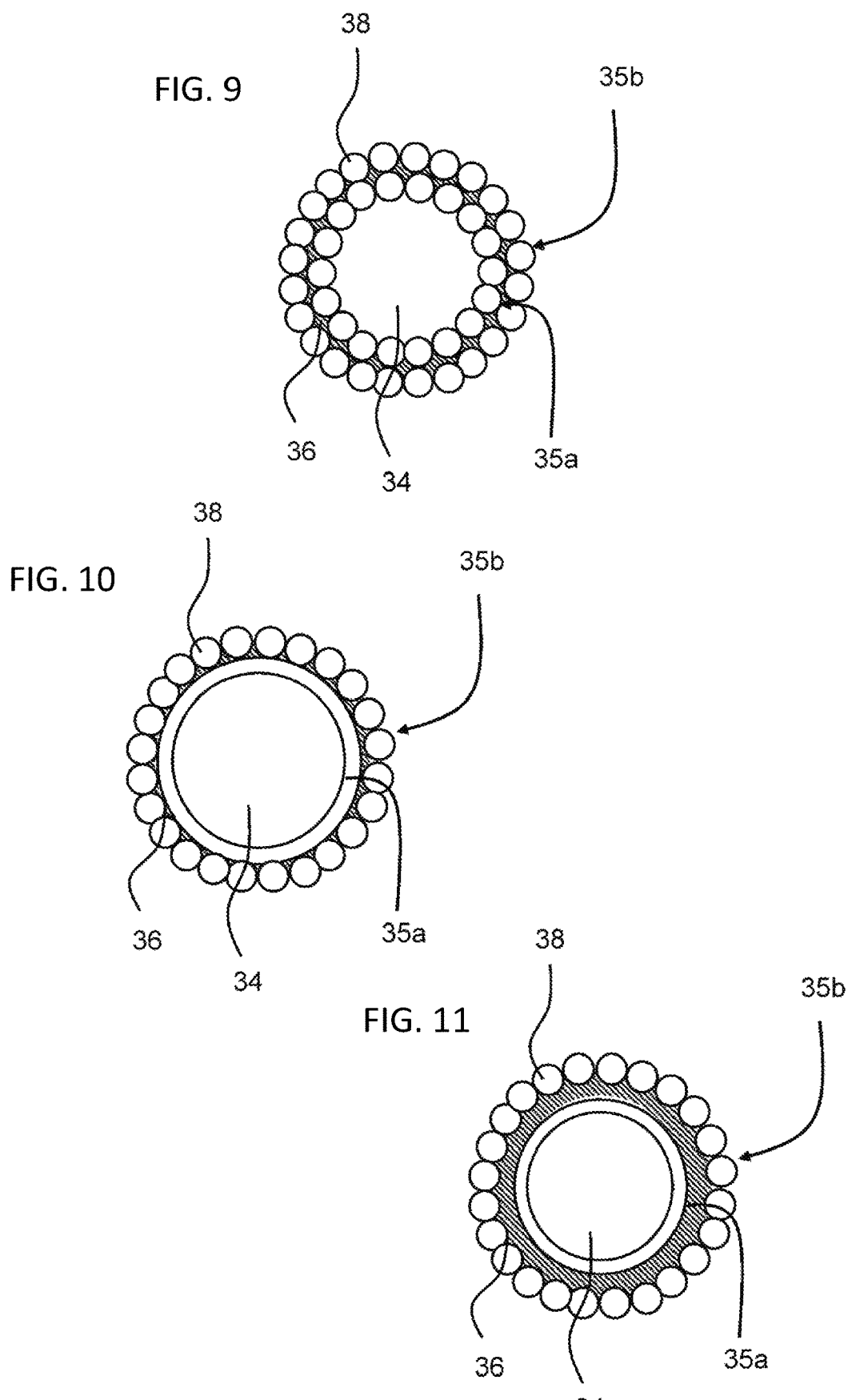
FIG. 9 shows an exemplary embodiment of adjoining ring-shaped focusing structures each providing a plurality of foci along a ring-shaped line.
FIG. 10 shows an exemplary embodiment of adjoining ring-shaped focusing structures where one of adjoining ring-shaped focusing structures provides a plurality of foci along a ring-shaped line and the other one provides a ring-shaped focal line.
FIG. 11 shows an exemplary embodiment of adjoining ring-shaped focusing structures where one of ring-shaped focusing structures provides a plurality of foci along a ring-shaped line and the other one provides a ring-shaped focal line where the ring-shaped focusing structures are located at a distance to each other.

Although the focusing structures 35*a,b* shown in FIG. 8 are formed by a ring of lenslets and are located at a distance to each other it is neither mandatory that the ring-shaped focusing structures 35*a,b* are located at a distance to each other nor that both ring-shaped focusing structures 36*a,b* are formed by a ring of lenslets. For example, the ring-shaped focusing structures 35*a,b* may be located so close together as to contact each other as it is shown in FIGS. 9 and 10. Moreover, one of the ring-shaped focusing structures 35*b* may provide a plurality of foci located on the ring-shaped line while another one of the ring-shaped focusing structures 35*a* provides the ring-shaped focal line, as it is shown in FIGS. 10 and 11. In any case, spaces present between the ring-shaped focusing structures 35*a,b* are filled by the diffuser 36.

The concepts of the present disclosure have been described with respect to exemplary embodiments thereof for illustrating the disclosure. However, a person skilled in the art realizes that the concepts of the present disclosure can be implemented by variants of the exemplary embodiments. For example, shape, number and cross-section of the ring-sized-focusing structures may differ from those described in the exemplary embodiments. Moreover, a person skilled in the art can envisage other manufacturing techniques for providing the ring-shaped focusing structures. For example, instead of forming the ring-shaped focusing structures on the front or back surface of the spectacle lens it would also be possible to provide, in the spectacle lens, ring-shaped zones with a refractive index that differs from the refractive index of the rest of the spectacle lens in order to provide the ring-shaped focusing structures. As a consequence, the ring-shaped focusing structures would be present in the spectacle lens rather than on a surface of the spectacle lens. Therefore, the present disclosure shall not be limited by the exemplary embodiments but only by the appended claims.

The term "comprising" (and its grammatical variations) as used herein is used in the inclusive sense of "having" or "including" and not in the exclusive sense of "consisting only of" The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens comprising:
an aperture having a focal power;
at least two ring-shaped focusing structures surrounding the aperture, wherein neighboring ring-shaped focusing structures each provide a ring-shaped focal line; and
a ring-shaped diffuser arranged between the ring-shaped focusing structures, wherein neighboring ring-shaped focusing structures adjoin each other with a ring-shaped contact line between them that forms the ring-shaped diffuser,
wherein the at least two ring-shaped focusing structures have cross sections that are identical along a complete ring.

2. The spectacle lens according to claim 1, wherein at least two of the ring-shaped focusing structures are configured to provide a myopic defocus at a same distance to a fovea of a wearer when the aperture provides a focused image on the fovea.

3. The spectacle lens according to claim 1, wherein the ring-shaped focusing structures are present on a back surface of the spectacle lens.

4. A spectacle lens kit comprising a spectacle lens as claimed in claim 1 and instructions including an as-worn position of the spectacle lens.

5. A data set comprising at least one kind of the following kinds of data:
(i) a representation of the spectacle lens as claimed in claim 1, wherein the representation is configured to be fed to one or more manufacturing machines for producing the spectacle lens; and
(ii) data containing computer-readable instructions for controlling one or more of the manufacturing machines to produce the spectacle lens as claimed in claim 1.

6. A method of manufacturing a spectacle lens, the method comprising:
forming at least a part of the spectacle lens as an aperture to provide a focal power; and
forming at least two ring-shaped focusing structures with focal powers such that the at least two ring-shaped focusing structures surround the aperture providing the focal power,
wherein neighboring ring-shaped focusing structures each provide a ring shaped focal line, wherein a ring-shaped diffuser is formed between the ring-shaped focusing structures,
wherein the neighboring ring-shaped focusing structures are formed such as to adjoin each other with a ring-shaped contact line between them that forms the ring-shaped diffuser, and
wherein the at least two ring-shaped focusing is structures have cross sections that are identical along a complete ring.

7. The method according to claim 6, wherein the at least two ring-shaped focusing structures are formed on a back surface of the spectacle lens.

8. The method according to claim 6, wherein first the spectacle lens providing the focal power is formed and then the at least two ring-shaped focusing structures are formed on a surface of the spectacle lens or in the spectacle lens so as to surround the aperture of the spectacle lens, the aperture becoming the part of the spectacle lens that provides the focal power.

9. The method according to claim 6, wherein the at least two ring-shaped focusing structures are formed by removing a material.

10. The method according to claim 9, wherein the material is removed by a cutting process.

11. A computer-implemented method of providing a spectacle lens design for the purpose of a use of the spectacle lens design for a manufacture of a spectacle lens for at least retarding myopia progression based on measured eye-data, the method comprising:
determining, based on the measured eye data, a spectacle lens with a focal power; and
determining at least two ring-shaped focusing structures to be positioned on the spectacle lens so as to surround an aperture providing the focal power, wherein neighboring ring-shaped focusing structures each provide a ring-shaped focal line, wherein the at least two ring-shaped focusing structures are determined to be positioned with a ring-shaped diffuser arranged between the at least two ring-shaped focusing structures, wherein the at least two of the ring-shaped focusing structures are determined such that the neighboring ring-shaped focusing structures adjoin each other with a ring-shaped contact line between them that forms the ring-shaped diffuser, and wherein the at least two ring-shaped focusing structures have cross sections that are identical along a complete ring.

12. The method according to claim 11, wherein the at least two ring-shaped focusing structures are determined to provide a myopic defocus at a same distance to a fovea of a wearer when the aperture provides a focused image on the fovea.

13. The method according to claim 11, wherein the ring-shaped focusing structures are determined to be formed on a back surface of the spectacle lens.

\*    \*    \*    \*    \*